(12) United States Patent
Gomi et al.

(10) Patent No.: US 9,879,790 B2
(45) Date of Patent: Jan. 30, 2018

(54) HIGH-PRESSURE TRUNNION BALL VALVE AND HYDROGEN STATION USING THE SAME

(71) Applicant: KITZ CORPORATION, Chiba (JP)

(72) Inventors: Takeshi Gomi, Nagano (JP); Ronald Guenther, Nidderau (DE); Osamu Watanabe, Yamanashi (JP)

(73) Assignee: KITZ CORPORATION, Chiba (JP)

( * ) Notice: Subject to any disclaimer, the term of this patent is extended or adjusted under 35 U.S.C. 154(b) by 0 days.

(21) Appl. No.: 14/913,547

(22) PCT Filed: Aug. 28, 2014

(86) PCT No.: PCT/JP2014/072593
§ 371 (c)(1),
(2) Date: Feb. 22, 2016

(87) PCT Pub. No.: WO2015/030122
PCT Pub. Date: Mar. 5, 2015

(65) Prior Publication Data
US 2016/0208936 A1 Jul. 21, 2016

(30) Foreign Application Priority Data
Aug. 28, 2013 (JP) ................................. 2013-176542

(51) Int. Cl.
*F16K 5/06* (2006.01)
*F16K 5/20* (2006.01)
*H01M 8/04082* (2016.01)

(52) U.S. Cl.
CPC ............ *F16K 5/201* (2013.01); *F16K 5/0605* (2013.01); *F16K 5/0626* (2013.01); *F16K 5/0694* (2013.01); *H01M 8/04201* (2013.01)

(58) Field of Classification Search
CPC ...... F16K 5/201; F16K 5/0694; F16K 5/0605; F16K 5/0626; H01M 8/04201
(Continued)

(56) References Cited

U.S. PATENT DOCUMENTS 2,839,074 A * 6/1958 Kaiser .................. F16K 5/0636
137/315.18
2,868,497 A * 1/1959 Graham ................ F16K 5/0464
251/172
(Continued)

FOREIGN PATENT DOCUMENTS

JP 59-24568 2/1984
JP 4-8669 2/1992
(Continued)

OTHER PUBLICATIONS

International Search Report issued Dec. 2, 2014 in International Application No. PCT/JP2014/072593.

*Primary Examiner* — John Bastianelli
(74) *Attorney, Agent, or Firm* — Wenderoth, Lind & Ponack, L.L.P.

(57) ABSTRACT

A high-pressure trunnion ball valve which is particularly suitable for a high-pressure fluid, the high-pressure trunnion ball valve is composed of a ball (10) rotatably provided in a body (3) having a lid member (2), a seat retainer (11) seal-connected to the ball, a spring member (12) applying an elastic force to the seat retainer to a seal side, and a seal member (13) attached to an outer circumferential face of the seat retainer. An upper stem (50) and a lower stem (51) having the same diameter are provided on an upper side and a lower side of the ball in an extending manner, respectively, to constitute a ball member (52), shaft-attaching seal mechanisms (20) having the same structure are attached to the upper and lower stems at symmetrical positions regarding (Continued)

the ball to achieve a balance structure, thereby avoiding thrust loads.

12 Claims, 12 Drawing Sheets

(58) Field of Classification Search
USPC .............. 251/174, 192, 214, 315.01–315.16; 137/312
See application file for complete search history.

(56) References Cited

U.S. PATENT DOCUMENTS

| | | | | | |
|---|---|---|---|---|---|
| 3,109,623 | A | * | 11/1963 | Bryant | ................... F16K 3/0227 251/172 |
| 3,154,094 | A | * | 10/1964 | Bredtschneider | ..... F16K 5/0636 137/315.19 |
| 3,266,769 | A | * | 8/1966 | Shand | .................... F16K 5/0673 251/172 |
| 3,414,233 | A | * | 12/1968 | Priese | ................... F16K 5/0678 251/172 |
| 4,479,513 | A | | 10/1984 | Koch et al. | |
| 4,566,482 | A | * | 1/1986 | Stunkard | ................ F16K 5/0636 137/240 |
| 4,572,239 | A | | 2/1986 | Koch et al. | |
| 4,676,480 | A | * | 6/1987 | Garceau | ................. F16K 5/201 251/159 |
| 6,578,598 | B2 | * | 6/2003 | Gardner | ................. F16K 5/0605 137/240 |
| 2011/0147634 | A1 | * | 6/2011 | Hiss | ...................... F16K 5/0636 251/315.03 |

FOREIGN PATENT DOCUMENTS

| | | |
|---|---|---|
| JP | 7-174247 | 7/1995 |
| JP | 2008-286228 | 11/2008 |
| JP | 2012-13143 | 1/2012 |

* cited by examiner (a)

(b)

(a)

(b)

HIGH-PRESSURE TRUNNION BALL VALVE AND HYDROGEN STATION USING THE SAME

TECHNICAL FIELD

The present invention relates to a ball valve, and in particular to a high-pressure trunnion ball valve suitable for an installation such as a hydrogen station where a high-pressure fluid such hydrogen flows, and a hydrogen station using the same.

BACKGROUND ART

In recent years, according to reconsideration of an energy policy, spreading of supply infrastructure of a hydrogen station for fuel cell automobiles is strongly propelled. In a piping installation where high-pressure fluid flows, such as a hydrogen station, for example, in a case of a pressure of hydrogen, there is a possibility that the pressure reaches high pressure of 80 MPa or more, so that it is necessary to accommodate high-pressure hydrogen gas with a pressure of about 103 MPa (15000 psi) or so in some cases. Therefore, in order to perform on/off of a flow path while maintaining a flow rate of high-pressure fluid, high-pressure trunnion ball valves are frequently used.

In the high-pressure trunnion ball valve, a torque during operation tends to become large because a high fluid pressure is applied to a valve body so that a force acts on a stem shaft mounting portion in a flow path direction from the valve body. Therefore, particularly, in a valve of such a type, it is required to stabilize operability while maintaining valve seat seal performance even under a high pressure and maintaining low torque performance during the operation.

As a ball valve of this type, for example, a high-pressure ball valve of Patent Literature 1 is disclosed. The high-pressure ball valve has stems provided at an upper portion and a lower portion of a ball portion, respectively, and the ball portion is attached inside a body according to a bottom entry structure via these stems. In FIG. 5 and FIG. 6 of the same Literature 1, such a structure is adopted that cylindrical stems are provided on the upper and lower portions of the ball portion to extend integrally, and O-rings are arranged at symmetrical positions regarding a ball of the stems, respectively.

On one hand, a ball valve of Patent Literature 2 is a trunnion ball valve where an upper stem and a lower stem which are cylindrical are integrated in a ball portion, where such a structure is adopted that radial bearings are arranged at symmetrical positions regarding the ball portion of the upper stem and the lower stem of the ball valve and a thrust bearing is arranged on an operation shaft connected to the upper stem.

CITATION LIST

Patent Literature

PTL 1: Japanese Patent Publication No. H04-8669
PTL 2: Japanese Patent Application Publication No. 2008-286228

SUMMARY OF INVENTION

Technical Problem

However, the high-pressure ball valve described in the former Patent Literature 1 stays in such a technique for accommodating a fluid pressure such as 2500 psi (about 17 MPa) or 6000 psi (about 41 MPa), where it is difficult to accommodate a high-pressure fluid exceeding the above values.

In addition, in a seal member composed of a combination of the O-ring and a backup ring adopted for a shaft seal of Patent Literature 1, it is difficult to seal a high-pressure fluid such as described above, and the O-ring may fly out of an O-ring groove. In order to prevent the O-ring from flying out, it is considered that a seal member with an elevated rigidity is adopted, but due to Patent Literature 1 having a structure where the seal member (O-ring) is attached in a groove provided on an outer circumference of the stem, it becomes difficult to attach the seal member to the groove when the rigidity of the seal member is enhanced.

When a high-pressure fluid is applied to a valve body of the high-pressure ball valve, a force acts on the stem from the valve body in a radial direction (in a direction perpendicular to a direction to the stem shaft), so that operation torques at times of opening and closing the valve body become large.

In addition, since the upper stem has a divided structure and a bearing of the radial direction or a bearing of a thrust direction (a direction of the stem shaft) is provided on the operation stem divided from the valve body, such a problem also arises that a structure becomes complicated and assembling and maintenance of the valve is time-consuming.

On one hand, in the ball valve described in the latter Patent Literature 2, since a shaft seal is performed on only an operation shaft constituted as a separate member from the upper stem, a large thrust load is applied to the operation shaft by a high-pressure fluid within a cavity, so that an operation torque of the valve becomes large. For reliable transmission of the operation torque, a thrust bearing is required and it is further necessary to provide the ball and the shaft of the stem thickly, and in particular, in order to prevent the strength of a fitting portion between the ball and the stem from being made weakest regarding the whole shaft, the shaft near the fitting portion must be provided so as to be thick.

However, when the shaft is provided so as to be thick, a thickness of the valve body must be correspondingly made thick so as to enhance the durability of the valve body, and in this case, the whole valve becomes large and heavy.

The present invention has been exerted in order to solve the above problems, and an object thereof is to provide a high-pressure trunnion ball valve that is particularly suitable for a high-pressure fluid, suppresses a thrust load to a stem to realize low torque performance while securing a valve seat sealing performance even under a high pressure, and can perform opening and closing operations with an approximately constant and stable operation torque and can be reduced in size, and a hydrogen station using the same.

Solution to Problems

In order to achieve the above object, an invention described in claim 1 is a high-pressure trunnion ball valve including a ball rotatably provided within a body having a lid member; a seat retainer seal-connected with the ball; a spring member applying an elastic force toward a seal side to the seat retainer; and a seal member attached to an outer circumferential face of the seat retainer, wherein an upper stem and a lower stem having the same diameter are provided on an upper portion and a lower portion of the ball in an extending manner, respectively, to constitute a ball member, and shaft-attaching seal mechanisms having the same structure are attached at symmetrical positions about the ball to constitute a balance structure, thereby avoiding thrust loads, and flange portions are provided at positions on the upper and lower stems in the vicinity of the ball, thereby holding ball side of bearings provided on outer circumferences of the upper and lower stems by the flange portions.

An invention described below is the high-pressure trunnion ball valve wherein the shaft-attaching seal mechanisms are each obtained by providing a U ring seal on the ball side, stacking a backup ring on the U ring seal, and providing a metal ring whose inner circumferential diameter has been slightly projected to an outer circumferential position.

An invention described below is the high-pressure trunnion ball valve wherein the ball member is inserted from a bottom side of the body to be disposed within the body, covering with the lid member is performed from the bottom side of the body, and the lower stem is attached to the lid member.

An invention described below is the high-pressure trunnion ball valve wherein a relief hole communicating with a lower portion of the lower stem is bored in the lid member.

An invention described below is the high-pressure trunnion ball valve wherein a revolution-preventing plate is attached to an abutting face between the body and the lid member.

An invention described below is the high-pressure trunnion ball valve wherein an inflow portion and an outflow portion are fixed to both side positions on the body in a flowpath direction of the body, an outer circumferential face of the body intersecting the flow path direction is formed in a flat face, and a leak port communicating with interior of the body is bored in the flat face.

An invention described in below is the high-pressure trunnion ball valve wherein diameter-expanding sliding portions are provided integrally with the upper and lower stems, respectively, and the diameter-expanding sliding portions are slidably provided in shaft-attaching holes of the body.

An invention described below is the high-pressure trunnion ball valve wherein coating layers made of diamond-like carbon are provided on surfaces of the ball member and the diameter-expanding sliding portions.

An invention described below is the high-pressure trunnion ball valve wherein sliding cylindrical bodies as separate members are attached on the upper and lower stems, and the sliding cylindrical bodies are slidably provided in the shaft attaching holes of the body.

An invention described in below is the high-pressure trunnion ball valve wherein communication portions causing the ball sides and the shaft-attaching seal mechanisms to communicate with each other are provided in the diameter-expanding sliding portions or the sliding cylindrical bodies.

An invention described below is the high-pressure trunnion ball valve wherein the communication portions are communication holes extending through outer circumferential faces of the diameter-expanding sliding portions or communication grooves formed on outer circumferences of the sliding cylindrical bodies in the axial direction.

An invention described below is a hydrogen station constituted by using a high-pressure trunnion ball valve in a supply line for high-pressure hydrogen.

Advantageous Effects of Invention

According to the invention described below, since a trunnion type where the ball is sealed by elastically forcing the seat retainer attached with the seal member to the seal side by the spring member is adopted, the invention is particularly suitable for a high-pressure fluid, and since occurrence of thrust loads is particularly avoided by setting the upper and lower stems to have the same diameter, attaching the shaft-attaching seal mechanisms having the same structure to the upper and lower stems at symmetrical positions regarding the ball to constitute the balance structure, frictional forces due to the thrust loads are not generated, the ball is prevented from displacing to the seal members even under a high pressure, leak can be securely prevented by being capable of maintaining the valve seat seal performance, and a low torque performance can be realized by supporting the ball in a well-balanced manner evenly by the upper and lower stems. By avoiding the occurrence of the thrust loads in this manner, it becomes unnecessary to use a thrust bearing, and a structure for protecting the shaft-attaching seal mechanisms from the thrust loads also becomes unnecessary, so that it also becomes possible to reduce the number of parts.

In addition, the bearings are prevented from flying out to the sides of the ball by the flange portions, the ball is held while the balance of the bearings is maintained, a force acting on the ball due to the fluid pressure is evenly received by the bearings attached at the symmetrical positions regarding the ball, and a valve operation particularly in the vicinity of the valve-closed position can be smoothly carried out when an opening operation or a closing operation of the value is performed.

According to the invention described below, the sealing performance is exerted while sliding resistance is being reduced by the U ring seal. By stacking the backup ring on the U ring seal, the flying-out of the U ring seal is prevented while a high sealing performance is being maintained, so that durability can be improved. By providing the metal ring whose inner circumferential diameter has been slightly protruded at the outer circumferential position, a seal part such as the U ring seal can be simply detached from the body utilizing the metal ring without breaking the seal part. Further, by causing the inner diameters of parts such as the U ring seal, the backup ring, the metal ring, and the bearing to coincide with each other, the upper and lower stems can be made as simple shafts, respectively, so that ease and high precision in working can be achieved.

According to the invention described below, since the bottom entry structure where the ball member is inserted from the bottom side of the ball to be assembled to the body is adopted, an assembling work can be easily performed even when it is difficult to perform assembling from the top side of the body. Thereby, for example, even when an operation actuator or an operation handle is provided at an upper portion of the upper stem, assembling can be easily performed without causing interference between these operation members and the lid member. Further, as compared with a top entry structure where the ball member is inserted from the top side of the ball, the size of the valve can be reduced.

According to the invention described in below, the lower stem can be inserted into the shaft attaching seal mechanism inserted into the lid member while air is prevented from being sealed in the lid member.

According to the invention described below, since the revolution-preventing plate member is attached to the abutting face between the body and the lid member, loosening of the lid member is prevented so that the positioned state of the ball can be held, and the sealing performance and the operability can be exerted reliably while leak of a high-pressure fluid is prevented.

According to the invention described in below, since the flow path is secured by fixing the inflow portion and the outflow portion to the body in the flow path direction of the body and the flat face is formed on the body, the whole valve is made compact by reducing excess thickness, and since the leak port is formed on the flat face, the leak port can be provided easily.

According to the invention described below, even if the shaft diameter of the ball side is made thick and load due to a fluid is made large by providing the diameter-expanding sliding portions integrally with the upper and lower stems, deformation of the whole ball member toward a bending direction can be prevented since clearances between the diameter-expanding sliding portions and the shaft-attaching holes can be reduced while strength is being secured. Thereby, even if a high-pressure fluid flows, rising of the radial load due to bending deformation of the ball member is blocked, so that the shaft seal performance, the valve seat seal performance and the low torque performance during operation are secured, and the thrust loads can be avoided by maintaining the balance structure by the ball member provided with the diameter-expanding sliding portions.

According to the invention described below, by providing the coating layer made of diamond-like carbon, surface smoothness and lubricity of the ball member and the diameter-expanding sliding portions are improved and bearing performances of the upper and lower stems are enhanced, so that the ball member can be smoothly operated while excellent slidability is being exerted.

According to the invention described below, by attaching the sliding cylindrical bodies as separate members to the upper and lower stems straight-shaped, clearances between the upper and lower stems and the shaft-attaching holes can be reduced, and deformation of the whole ball member in the bending direction can be prevented. Thereby, even when a super high-pressure fluid with a pressure of 103 MPa or more flows, rising of the radial loads is blocked to secure the shaft seal performance, the valve seat seal performance, and the low torque performance during operation so that the balance structure can be maintained and thrust loads can also be avoided.

According to the inventions described below, the pressure in the cavity is secured evenly by causing the ball side and the shaft-attaching seal mechanism sides to communicate with each other via the communication portions composed of the communication holes provided in the diameter-expanding sliding portions of the upper and lower stems, and the shaft seal performance using the shaft-attaching seal mechanisms is maintained so that opening and closing operations of the valve can be performed while the balance structure is being held. Further, by providing communication portions composed of the communication grooves in the sliding cylindrical bodies provided on the upper and lower stems as separate members, a fluid from the ball side is caused to pass through the shaft-attaching seal mechanism sides via the communication grooves to make it possible to prevent the sliding cylindrical bodies from moving outside the valve due to fluid pressure, so that the balance structure can be maintained and damage of the shaft-attaching seal mechanisms due to contact with the sliding cylindrical bodies can be avoided.

According to the invention described below the high-pressure trunnion ball valve that is suitable particularly for a high-pressure fluid, suppresses thrust loads to the stems to realize low torque performance while maintaining sealing performances of the shaft-attaching portions even under a high pressure, and can be operated in opening and closing manners by an approximately constant and stable operation torque is provided, and according to the ball valve, while leak of a high-pressure fluid can be prevented by the ball valve reliably, supply and stop of a predetermined amount of hydrogen can be performed owing to excellent torque performance by operating the valve body automatically or manually.

Figure 1:
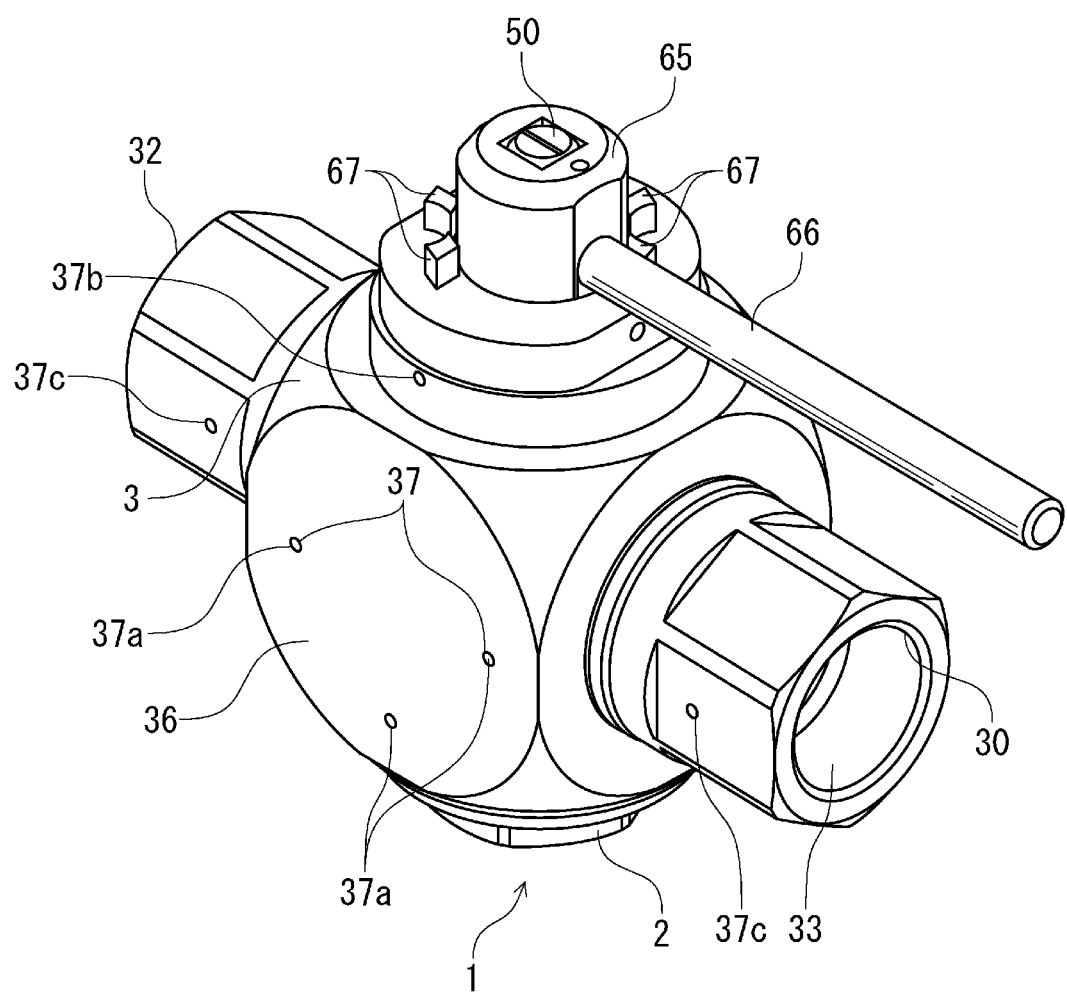
FIG. 1 is a perspective view showing an embodiment of a high-pressure trunnion ball valve of the present invention.

REFERENCE SIGNS LIST 1, 90, 120 . . . ball valve main body (valve main body)
2 . . . lid member
3 . . . body
10 . . . ball
11 . . . seat retainer
12 . . . spring member
13 . . . O-ring (seal member)
20 . . . shaft-attaching seal mechanism
28 . . . relief hole
32 . . . inflow portion
33 . . . outflow portion
36 . . . flat face
37 . . . leak port
50 . . . upper stem
51 . . . lower stem
52 . . . ball member
53 . . . flange portion
55 . . . O ring seal
56 . . . backup ring
57 . . . metal ring
58 . . . bearing
61 . . . revolution-preventing plate member
63 . . . fixing bolt (retaining member)
78 . . . supply line 100 . . . diameter-expanding sliding portion
101 . . . coating layer
110 . . . communication hole (communication portion)
130 . . . sliding cylindrical body
140 . . . communication groove (communication portion)

DESCRIPTION OF EMBODIMENTS

Hereinafter, embodiments of a high-pressure trunnion ball valve according to the present invention and a hydrogen station using the same will be explained in detail with reference to the drawings. FIG. 1 shows an embodiment of a high-pressure trunnion ball valve according to the present invention, and FIG. 2 is an enlarged sectional view of the high-pressure trunnion ball valve shown in FIG. 1.

In the figures, a ball valve main body (hereinafter, called "valve main body") 1 in the present invention is composed of a trunnion structure particularly suitable for a case where a high-pressure fluid is caused to flow, and has a body 3 with a lid member 2, and a ball 10, seat retainers 11, spring members 12, seal members 13, spring retainers 14, auxiliary rings 15, and shaft-attaching seal mechanisms 20 which are included in the body 3. The term "high pressure" in this embodiment means, for example, 35 MPa or more, and a high pressure such as 70 to 105 MPa, specifically 103 MPa or so is supposed as a valve for a piping installation for a hydrogen station. The valve main body 1 in the present invention can accommodate a temperature change of a fluid between −50 and 85° C., for example.

The body 3 of the valve main body 1 is made of stainless steel (SUS), for example, and in the body 3, a hole-shaped attaching portion 21 is provided in a flow path direction (a horizontal direction in FIG. 2) inside the body 3, a shaft-attaching hole 22 is provided in a shaft-attaching direction (a vertical direction in FIG. 2) of the ball 10 on an upper side of the body 3, an insertion hole 23 is provided on a lower side of (a bottom side) of the body 3, and a female screw portion 24 is provided on a portion of an inner circumference of the insertion hole 23. The valve main body 1 is set to have a weight of about 2.5 kg, for example.

Figure 2:
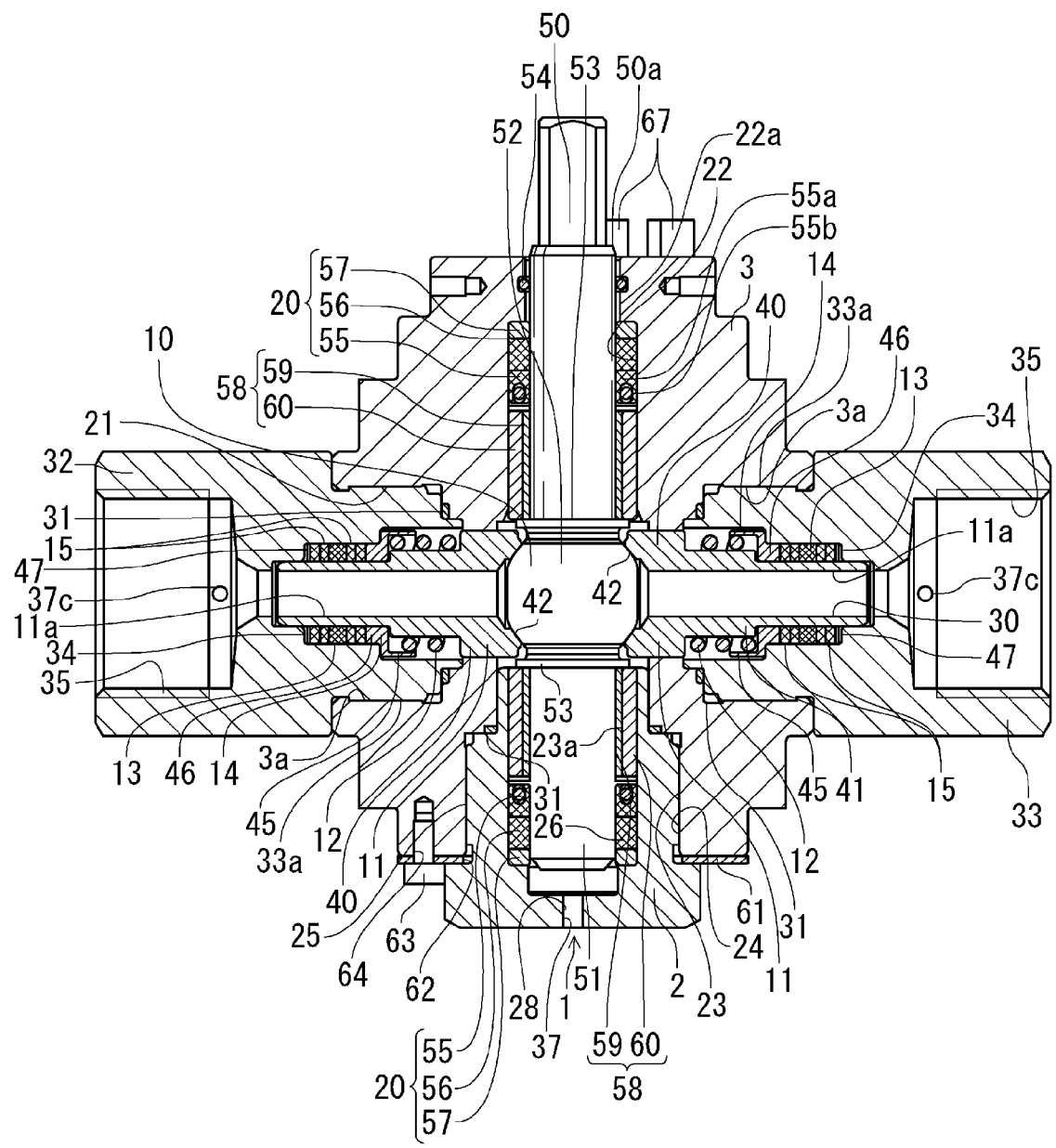
FIG. 2 is an enlarged sectional view of the high-pressure trunnion ball valve shown in FIG. 1.

The lid member 2 shown in FIG. 2 is formed of SUS in a lid shape, for example, has a male screw portion 25 screwed on the female screw portion 24, and is provided attachably and detachably from a bottom side of the body 3 via the male screw portion 25. A shaft-attaching hole 26 having the same diameter as that of the shaft-attaching hole 22 of the body 3 is provided inside the lid portion 2, and subsequently to the shaft-attaching hole 26, a relief hole 28 communicating with a lower portion of a lower stem 51 described later is further bored on the bottom face side. The relief hole 28 exerts air vent function at a part insertion time during assembling of the valve main body 1, and it exerts a function of a leak port region after the assembling. An annular gasket 31 made of copper, for example, is attached to a depth side (the ball side) of the female screw portion 24 to perform sealing between the body 3 and the lid member 2.

Figure 5:
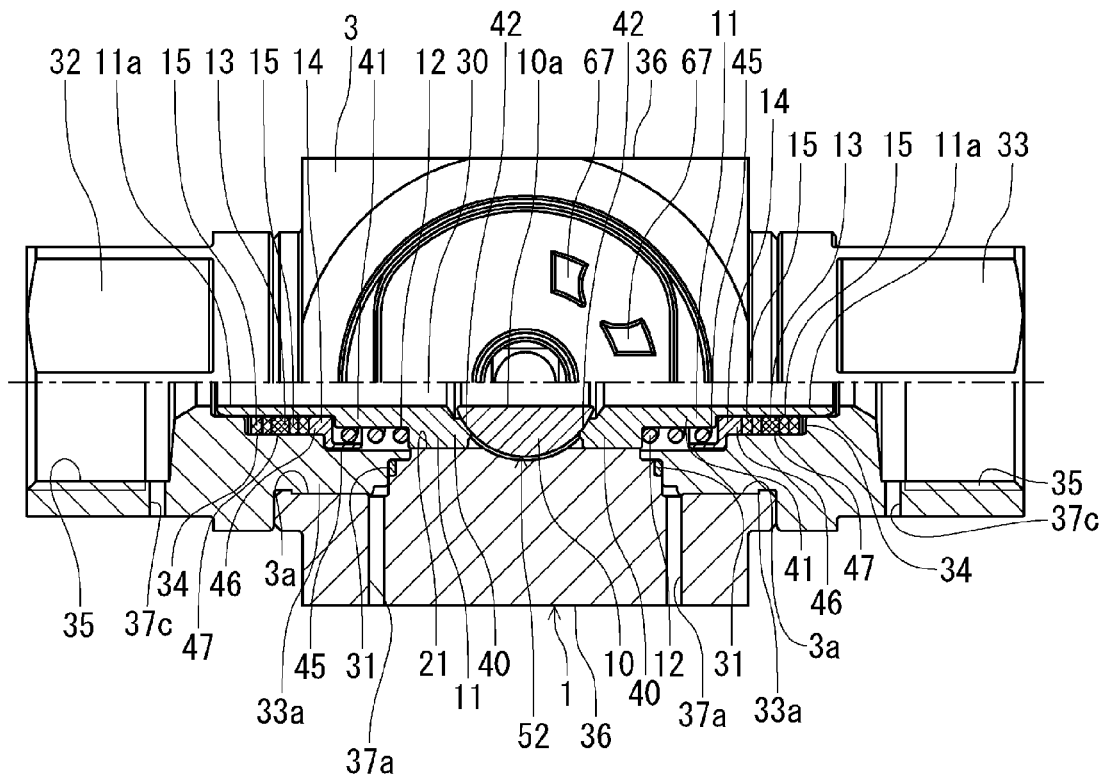
FIG. 5 is a partially broken plan view of the high-pressure trunnion ball valve shown in FIG. 2.

In FIG. 2 and FIG. 5, the ball 10, the seat retainers 11 and the like are attachably provided in the attaching portion 21 of the body 3, and a flow path 30 is formed within the body 3 through these members. Further, female screws 3a are provided on both sides of the body 3, male screws 32a and 33a provided on cap-shaped inflow portion 32 and cap-shaped outflow portion 33 made of SUS, respectively, are screwed to the female screws 3a, and the inflow portion 32 and the outflow portion 33 are fixed to the body 3, respectively. Annular gaskets 31 made of, for example, copper are attached to depth sides (the ball side) of the female screws 3a, so that sealing between the body 3, and the inflow portion 32 and the outflow portion 33 is performed. In this embodiment, the gaskets 31 having the same size and the same material as those of the gasket performing sealing between the above-described body 3 and lid member 2 are used.

Step-like attaching holes 34 and 34 are formed on the body connecting sides of the inflow portion 32 and the outflow portion 33, and the seat retainers 11, the spring members 12, the seal members 13, the spring retainers 14, and the auxiliary rings 15 are attached to the attaching holes 34 and 34, respectively. Female screws 35 and 35 are formed on the other sides of the attaching holes 34 in the inflow portion 32 and the outflow portion 33, and external pipes (not shown) are provided so as to be connectable to the body 3 via the female screws 35 and 35.

Both the inflow side and the outflow side within the body 3 is provided to have the same valve seat seal structure, namely, a symmetrical structure regarding FIG. 2.

As shown in FIG. 1, an outer circumferential face intersecting the flow path direction in the body 3 is formed in a flat face 36, and a leak port 37a communicating with inside of the body 3 is bored in the flat face 36 as one of leak ports 37.

The seat retainer 11 inside the body 3 in FIG. 2 is formed of copper-based alloy such as, for example, BeCu alloy (beryllium copper alloy) as a matrix, and, for example, Vickers hardness (Hv) is set to about 360 to 450 by performing proper heat treatment to the matrix. When the seat retainer 11 is formed of copper-based alloy, embrittlement due to hydrogen is prevented.

The seat retainer 11 is provided so as to be seal-connectable to the ball 10, has a diameter-expanding portion 40 arranged so as to face the ball 10 side and a cylindrical portion 41 reduced in diameter as compared with the diameter-expanding portion 40. A seal face 42 is provided on a face of the diameter-expanding portion 40 facing the ball 10 side, a coating layer 42a made of, for example, DLC (diamond-like carbon) is applied to the seal face 42 in FIG. 7. The DLC is an amorphous hard film mainly made of hydrocarbon or carbon allotrope, has high hardness, and is excellent in properties such as lubricity, wear resistance, surface smoothness, and chemical stability. As a method at an application time of DLC, there are film forming methods such as plasma CVD process, PVD process and the like.

Figure 7:
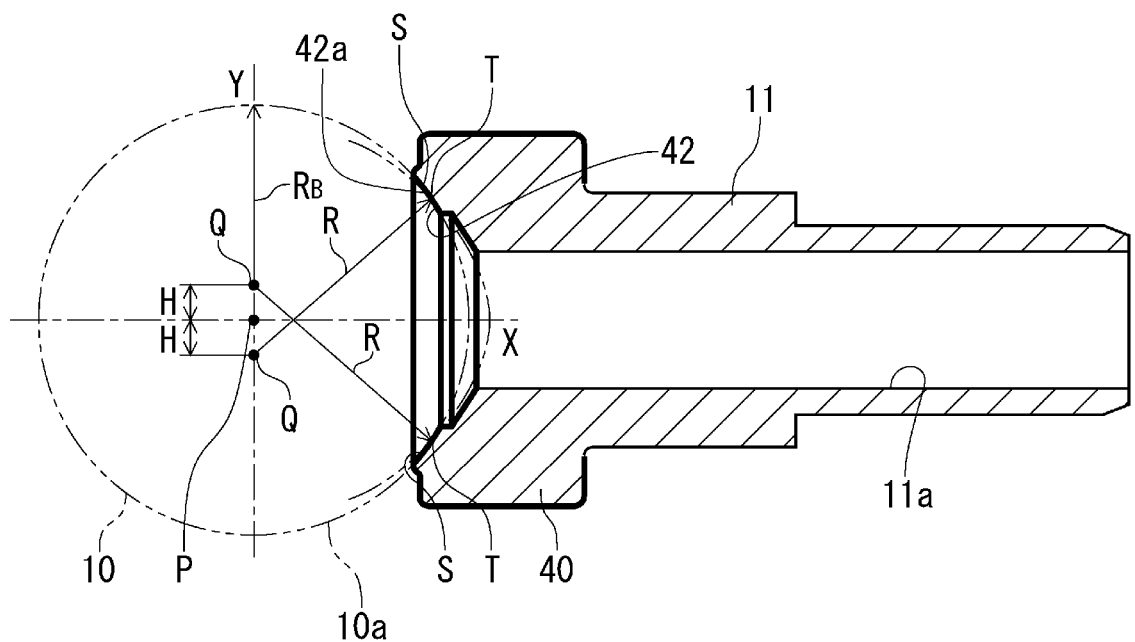
FIG. 7 is a vertically sectional view showing a seat retainer.

Here, in FIG. 7, the case where the seal face 42 of the seat retainer 11 is provided will be described. In the figure, X axis in the flow path direction of the ball 10 from a spherical diameter center point P of the ball face 10a of the ball 10 and Y axis intersecting the X axis are provided. Two deviation points (offset points) Q and Q are provided to be spaced from each other by a predetermined distance H from the spherical diameter center point P in the Y axis direction. Semi-spherical faces S and S are drawn by a radius R slightly longer that a radius $R_B$ of the ball face 10a at an angle of 180° in a direction opposed to the deviation (offset) side from the respective offset points Q and Q, respectively, so that the seal face 42 having a portion of the semi-spherical face S as a locus face is constituted. That is, in FIG. 7, the seal face 42 is a portion of a locus of a slightly long radius R of the ball face 10a drawn from the offset points Q and Q of the predetermined distance H, so that the seal face 42 is drawn with the radius R.

Figure 3:
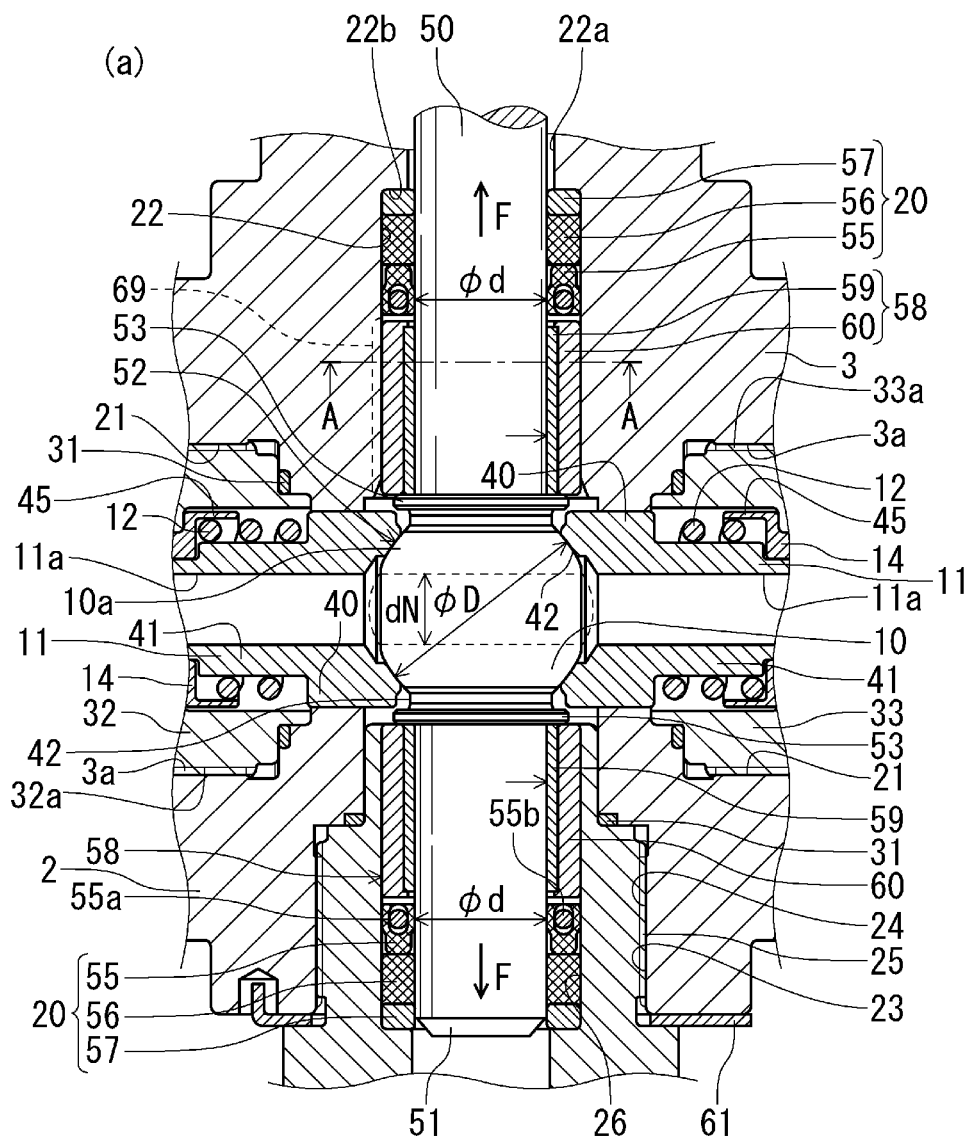
FIG. 3(a) is an enlarged section view of a main section of the high-pressure trunnion ball valve in a valve-opened state shown in FIG. 2.
FIG. 3(b) is a sectional view taken along line A-A in FIG. 3(a)
Figure 3:
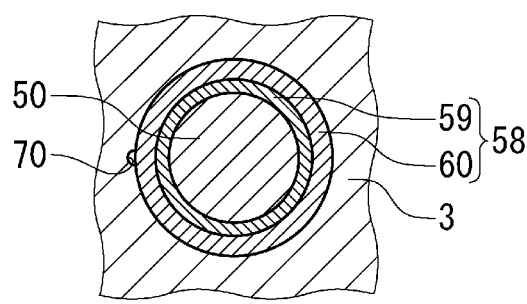

At this time, the predetermined distance H of the offset point Q is set such that a seal position T with the ball face 10a of the seal face 42 is located at an approximately central position of the seal face 42. As one example, when an internal flow path diameter dN of the ball 10 in the FIG. 3 is 10 mm and a spherical diameter ØD of the ball face 10a is Ø20 mm (the radius $R_B$ is 10 mm), an offset point Q is set such that the distance H is Δh as a slightly long radius R (radius $R_B+\Delta r$), so that the locus face can be drawn from this offset point Q. The predetermined distance H of the offset point Q from the spherical center point P can be changed appropriately according to the spherical diameter of the ball face 10a. In this embodiment, setting is performed so as to satisfy the relationship of $\Delta r > \Delta h$.

If the seal face 42 of the seat retainer 11 is set so as to have a radius slightly longer than the ball face 10a without providing the offset point Q, the ball 10 abuts on an inner circumferential edge region of the seal face 42 of the seat retainer 11. If so, the inner circumferential edge region locally abuts on the ball face 10a, so that a possibility that the DLC is broken increases. In order to avoid this, a technique for avoiding the local abutting by rounding the inner circumferential edge region is considered, but the position of the ball 10 is displaced in the X axis direction, which results in such a new problem that the shaft portion or the like positioned at an upper portion of the ball 10 must be made thin.

In this embodiment, by providing the offset point Q, the seal position between the seal face 42 of the seat retainer 11 and the ball face 10a has been set so as to be located a an approximately central position of the seal face. In addition, by applying a finishing work before application of the DLC to the ball 10, sealing between the seat retainer 11 and the ball 10 is performed by a surface contact seal.

In this case, the seal face whose abutting is performed by a line contact or a surface contact is provided, and even the line contact forms a contact seal face with a predetermined width. For example, the width of the surface contact seal is an annular closely-contact region formed approximately parallel to the Y axis, and it is set to have a width of about 0.5 mm, for example. Since the trunnion ball valve of this embodiment is one for a high pressure, the ball 10 is slightly displaced by a fine amount according to a fluid pressure, but the annular closely-contact region is maintained by setting the surface contact seal width in the above manner. In addition, since the seal position T is set at the approximately central position of the seal face 42, even if the position of the seal position T slightly displaces during use of the ball valve, the annular closely-contact region is maintained. Incidentally, the seat retainer 11 may be one applied with a surface treatment other than the DLC or it may have a shape other than the offset point Q, or such a structure that a ball seat made of resin or the like is assembled into the seat retainer 11 separately may be adopted.

As shown in FIG. 2 and FIG. 5, the spring member 12, the spring retainer 14, the seal member 13, and the auxiliary ring 15 are attached to the outer circumference of the cylindrical portion 41, and the cylindrical body 41 is inserted into the attaching hole 34 in this state, so that the seat retainer 11 is movable in the flow path direction.

The spring member 12 is provided in be coil spring shape from SUS, for example, and it is confined between the diameter-expanding portion 40 of the seat retainer 11 and the spring retainer 14 in an elastically-forced state. Thereby, an elastic force is imparted to the seat retainer 11 toward the side sealing the ball 10 by the spring member 12. The spring member 12 is not limited to the coil spring, and it may be a disc spring (not shown), for example. When the disc spring is provided as the spring member, a high load can be obtained in a space approximately equal to that for the coil spring by providing a plurality of disc springs with a proper spring constant, and it may be made possible to improve the seal performance particularly under a low pressure difference between the inflow side and the outflow side of the ball valve.

The spring retainer 14 is formed in a cylindrical shape from SUS, for example, and it has a diameter-expanding annular portion 45 and an insertion cylindrical portion 46 reduced in diameter to be smaller than the diameter-expanding annular portion 45. The spring member 12 is attached to an inner circumferential side of the diameter-expanding annular portion 45 of the spring retainer 14, and the insertion cylindrical portion 46 is attached to a diameter-reduced hole portion 47 on the diameter-reduced side of the attaching hole 34.

The seal member 13 is composed of an O-ring made of rubber such as ethylene propylene rubber, for example, it is formed of PTFE (polytetrafluoroethylene) or PEEK (polyether ether ketone), and it is attached between the cylindrical portion 41 and the diameter-reduced hole portion 47 in such a state that it has been sandwiched between the auxiliary rings 15 for backup. With this attached structure, the seal member 13 is attached to the outer circumferential face of the seat retainer 11 in such a state that both sides thereof have been protected by the auxiliary rings 15.

Figure 4:
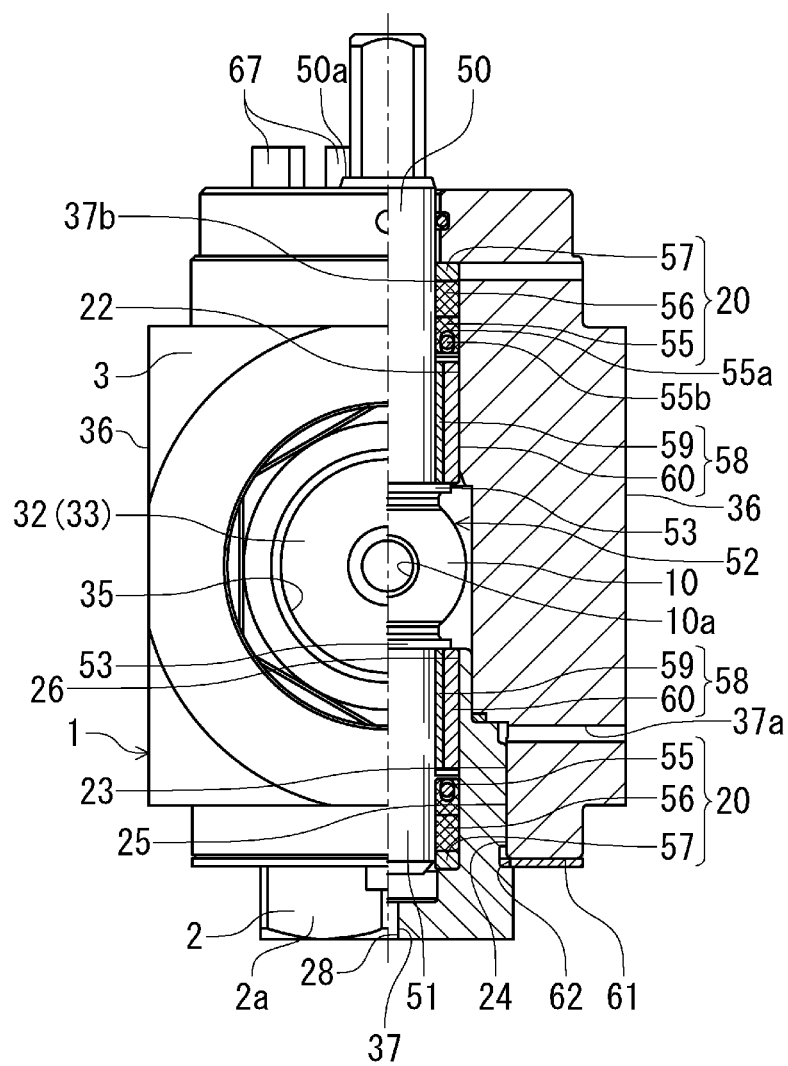
FIG. 4 is a partially broken side view of the high-pressure trunnion ball valve shown in FIG. 2.

In FIG. 2 to FIG. 4, the ball 10 is made of SUS, for example, and an upper stem 50 and a lower stem 51 which have the same diameter are provided so as to extend to regions sealed by at least shaft-attaching seal mechanisms 20 described later on an upper portion and a lower portion of the ball 10, so that the ball member 52 is constituted by these members.

Outer diameters Ød of the upper stem 50 and the lower stem 51 in FIG. 3 are set to have diameters smaller than the spherical diameter ØD of the ball 10. Thereby, the outer diameters Ød can be set to be smaller than the diameters of the shaft attaching hole 22 and the insertion hole 23 of the body 3, respectively, the thickness of the body 3 or the lid member 2 required for withstanding the pressure of a fluid can be made thin, and the size of the valve main body 1 can be made small. Since distances (a moment arms) from the axial centers of the upper stem 50 and the lower stem 51 to the contact faces with the bearings 58 are made small due to reduction of the outer diameters of the upper stem 50 and the lower stem 51, sliding resistances during rotations of the upper and lower stems 50 and 51 are suppressed so that rising of the operation torque can be prevented. As the ball spherical diameter ØD, for example, ØD=20 mm can be adopted. If the stem outer diameters on upper and lower sides are larger than the ball spherical diameter, the body becomes large according to the stem outer diameters, and the above-described moment arms become large, and the sliding resistances increase so that the operation torque becomes large, but this phenomenon can be prevented by the above constitution.

The ball 10 is provided to be capable of being inserted from the bottom side of the body 3, so that the upper stem 50 is attached to the shaft-attaching hole 22 inside the body 3, and the bottom side of the body 3 is covered with the lid member 2 in this state and the lower stem 51 is attached to the shaft-attaching hole 26 of the lid member 2, so that the ball 10 can be disposed at a predetermined position within the body 3.

The shaft attaching seal mechanisms 20 and 20 are attached to the shaft-attaching holes 22 and 26 on the outer circumferences of the upper and lower stems 50 and 51, respectively, and the ball member 52 is rotatably disposed within the body 3 via the shaft attaching seal mechanism 20. The ball 10 is operated in a revolving manner by the upper stem 50, and when the communication hole 10a formed inside the ball 10 and the internal flow path 11a of the seat retainer 11 communicate with each other, a fluid flows into the valve main body 1. Flange portions 53 are provided at positions on the upper and lower stems 50 and 51 in the vicinity of the ball 10.

The shaft-attaching seal mechanism 20 has a U ring seal 55, a backup ring 56, and a metal ring 57, and sizes of inner diameters and outer diameters of the respective parts are set approximately equally.

In the shaft-attaching seal mechanism 20, the U ring seal 55 is provided on the ball 10 side, the backup ring 56 is stacked on the U ring seal 55, and the metal ring 57 is stacked on an outer circumferential position (a position of an outer circumferential side viewed from the ball 10) of the backup ring 56.

The U ring seal 55 is composed of an outer circumferential portion 55a made of polyethylene and a core metal (spring) 55b, and it is set in order to exert a seal function such that an inner diameter thereof is slightly smaller than the outer diameter of the upper stem 50 and an outer diameter thereof is slightly larger than the inner diameter of the shaft-attaching hole 22.

The U ring seal 55 in this embodiment is provided equally to a commercially-available U packing. The U ring seal 55 has a structure where an outer circumferential portion 55a in U shaped section constitutes a lip portion and the lip portion is expanded in diameter by a fluid pressure so that the upper and lower stems 50 and 51 and the body 3 and the lid member 2 are sealed. Therefore, as compared with a seal part structured so as to apply a pressing force, such as an O ring, a seal region can be made small, and a sliding resistance can be reduced. Such a U ring seal 55 is also called "lip packing".

The backup ring 56 is made of polyethylene, for example, and it is interposed between the U ring seal 55 and the metal ring 57 to prevent the U ring seal 55 from projecting toward the center side of the shaft-attaching hole 22 and serve as a cushion between the U ring seal 55 and the metal ring 57, and also withstand a high pressure from the cavity side. By changing the material or the structure of the backup ring 56, it is also made possible to exert a function serving as a bearing.

The metal ring 57 is made of aluminum copper alloy. A small-diameter portion 22a is provided on an upper portion of the shaft-attaching hole 22 in the body 3 arranged with the metal ring 57, and a step portion 22b is formed by the small-diameter portion 22a. An upper face of the metal ring 57 is engaged by the step portion 22b. An inner diameter of the metal ring 57 is set to be slightly larger than the outer diameters of the upper and lower stem 50 and 51, and be slightly smaller than the inner diameter of the small-diameter portion 22a. Thereby, the inner diameter side of the metal ring 57 can be visually confirmed from above the small-diameter portion 22a. The metal ring 57 is not required to have a function serving as a thrust bearing.

As shown in FIG. 2, an O-ring 54 is attached to the small-diameter portion 22a. The O-ring 54 is not provided for sealing a fluid pressure but it is attached for preventing water or dusts from entering the small-diameter portion 22a and assisting a function of a leak port 37 described later.

Bearings 58 are provided in respective shaft-attaching holes 22 and 26 on the body 3 side and the lid member 2 side on outer circumferences of the upper and lower stems 50 and 51 nearer to the ball 10 side than the shaft-attaching seal mechanisms 20, and the bearing 58 is composed of a radial bearing 59 composed of PTFC and a core metal and positioned on the inner circumferential side, and a spacer 60 made of aluminum copper alloy and positioned on the outer circumferential side, for example.

The bearing 58 does not have a seal function, so that a fluid can pass through on an inner-diameter side and an outer-diameter side thereof. Thereby, a fluid pressure is applied to an upper face and a bottom face of the bearing 58, but since areas of the respective faces are the same, loads acting on the respective faces from the fluid pressure becomes approximately equal to each other, and since directions where the respective faces receive loads are opposed to each other, these loads are cancelled.

Therefore, since a difference pressure is not applied between the upper face and the bottom face, the bearing 58 is not moved by a fluid pressure, so that the bearing 58 is inserted between the shaft-attaching hole 22 and the upper stem 50 or the lower stem 51 in a floating state, loads in the radial directions are received by the upper and lower bearings 58 and 58 evenly in a well-balanced manner.

Thus, since the bearing 58 is not required to be engaged in the shaft-attaching hole 22, the bearing 58 can be attached subsequently to the seal parts such as U ring seal 55, so that the structure of the vale is simple, assembling or maintenance becomes easy, and any thrust bearing is not also required.

In addition, in order to transmit a fluid pressure to the upper face of the bearing 58 sufficiently, as shown in FIG. 3, in the axial direction extending up to before the U ring seal 55, a fluid introduction groove 69 may be provided at a position facing the bearing 58 of the shaft-attaching hole 22. In this case, a fluid pressure can also be transmitted to the U ring seal 55 sufficiently by the fluid introduction groove 69, and shaft sealing can also be performed securely.

The ball 10 sides of the bearings 58 are held by the flange portions 53 of the upper and lower stem 50 and 51. Thereby, it is restricted that the bearings 58 are moved to the ball 10 side due to their self-weight. The flange portion 53 in this embodiment is formed to have an outer diameter capable of holding the spacer 60 constituting an outer periphery of the bearing 58. The bearing 58 on the lower stem side 51 may abut on the upper face of the U ring seal 55 due to its self-weight.

As shown in FIG. 3, a U ring seal 55 side end face of the spacer 60 constituting the bearing 58 is formed in an approximately L shape in section. Thereby, the radial bearing 59 attached to the inner-diameter side of the spacer 60 is engaged at the approximately L-shaped region in section, so that it becomes easy to temporarily assemble the spacer 60 and the radial bearing 59 to each other. An inner-diameter distal end side of the approximately L-shaped side is formed to be slightly expanded as compared with the inner diameter of the radial bearing 59, so that the inner-diameter distal end side does not contact the upper or lower stem 50 or 51 and damage of the spacer 60 or the like is prevented.

According to the above configuration, the shaft-attaching seal mechanisms 20 are attached to the upper and lower stems 50 and 51 such that they have the same structure at symmetrical positions regarding the ball 10. Here, the same structure means that seal diameters of the seal members (the U ring seals 55 in this embodiment) are at least the same. In the ball 10, as described above, the upper stem 50 and the lower stem 51 have the same diameter, and the balance structure is achieved by attaching the shaft-attaching seal mechanisms 20 to the upper stem 50 and the lower stem 51. The thrust loads can be avoided by this balance structure.

The balance structure means such a structure that even at an application of a fluid pressure, a load acting so as to move the ball 10 in the thrust direction (the stem shaft direction) is cancelled by making the symmetrical load regarding the upper direction and the lower direction. The balance structure can be obtained by integrating the ball 10 with the upper stem 50 and the lower stem 51 and attaching the seal member to the respective stems 50 and 51. In this embodiment, the seal member is constituted by the U ring seal 55.

In order to obtain the balance structure, it is necessary to cause the seal diameters of the U ring seals 55 and 55 of the upper and lower stems 50 and 51 to coincide with each other, so that movement of the ball 10 toward the thrust direction is blocked. In this case, regarding the upper side and the lower side, distances from the ball 10 to the seal position of the U ring seal 55 are not required to coincide with each other. That is, when the seal diameters of the upper and lower U ring seals 55 and 55 are the same, even if the distances from the ball 10 to the seal positions are the same or different from each other, the thrust load can be cancelled by the balance structure. For example, even if step portions are formed on the upper stem 50 and the lower stem 51, when the seal diameters of the upper and lower U ring seals 55 and 55 are the same, a function based upon the balance structure is exerted. On one hand, even if the distances from the ball 10 to the upper and lower seal positions of the U ring seals 55 are the same, when the seal diameters of the upper and lower U ring seals 55 and 55 are different from each other, it becomes difficult that the function based upon the balance structure is exerted.

The shaft-attaching seal mechanism 20 and 20 of the shaft-attaching seal mechanisms 20 which is attached to the lower stem 51 is inserted into the lid member 2. The lid member 2 is formed such that the inner side (the ball side) of the valve main body 1 thereof constitutes a minimum diameter portion, and the bearing 58 is inserted into the minimum diameter portion. In this embodiment, by forming the minimum diameter portion to be slightly larger than the spherical diameter of the ball 10, the ball 10 is inserted into the valve main body 1 via a depth portion 23a of the insertion hole 23 of the lid member 2 corresponding to the minimum diameter portion.

The leak ports 37 are roughly classified to three portions of a leak port portions 37a, leak port holes 37b and leak relief holes 28, and leak port holes 37c. The above-described leak port portion 37a is provided for visually confirming seal performance of the annular gasket member 31, and it is attached to seal portions between the lid member 2 and the inflow portion 32 or the outflow portion 33, and the valve main body 1. Presence/absence of leak from the gasket member 31 can be confirmed via the leak port portion 37a.

In FIG. 1 and FIG. 4, the leak portion hole 37b is formed in the vicinity of the metal ring 57-attaching region of the body 3, and presence/absence of leaks from the U ring seals 55 attached to the upper and lower stems 50 and 51 can be confirmed by the leak port hole 37b and the above-described relief hole 28. Particularly, the leak port hole 37b on the upper stem 50 side is provided at a position facing the metal ring 57, so that the constituent parts of the shaft-attaching seal mechanism 20 are prevented from projecting into the leak port hole 37b or being damaged due to a high-pressure fluid. In this case, the projecting or the damage are securely prevented owing to the metal ring 57, and, for example, when a resin-made ring such as polyethylene resin is provided instead of the metal ring 57, there is a possibility that the ring cannot withstand a high pressure, resulting in occurrence of rupturing or the like.

The leak port hole 37c is provided in the vicinity of a connection region with an external piping in order to confirm seal performance between a piping and the connection region. Presence/absence of leak from a seal portion (not shown) with the piping in the inflow portion 32 or the outflow portion 33 can be confirmed by the leak port hole 37c.

Figure 6:
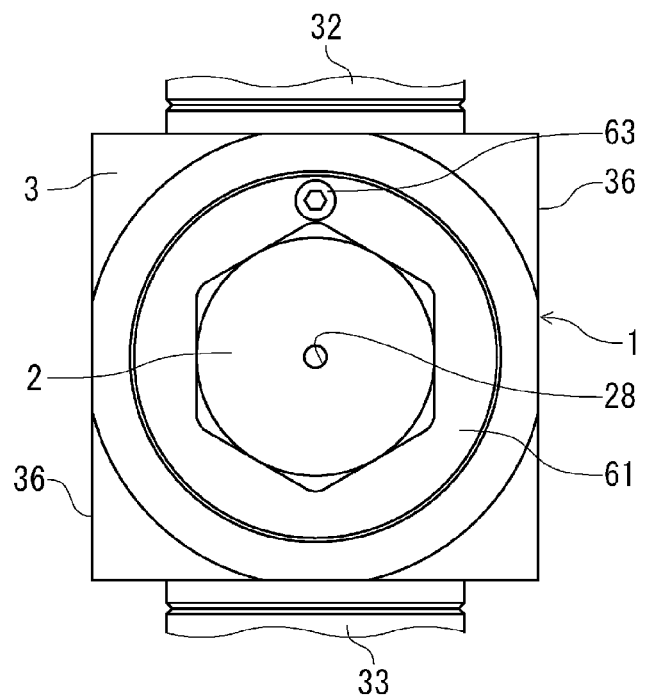
FIG. 6 is a partially omitted bottom view of the high-pressure trunnion ball valve shown in FIG. 2.

As shown in FIG. 4 and FIG. 6, a revolution-preventing plate member 61 is attached to an abutting face between the body 3 and the lid member 2. The revolution-preventing plate member 61 is formed in an approximately annular shape from SUS which is, for example, the same material as that of the body 3 or the lid member 2, it is provided with a through-hole 62 in which the male screw 25 of the lid member 2 can be inserted at a central potion thereof in FIG. 2, an outer shape thereof is formed so as to project partially from a hexagonal face 2a of the lid member 2, and the projecting portions are bent along the hexagonal face. Thereby, the lid member 2 after attached is hard to be loosened to the body 3 so that the revolution-preventing plate member 61 is firmly integrated with the lid member 2.

Further, an attaching hole 64 for attaching a fixing bolt 63 serving as a retaining member is provided in the revolution-preventing plate member 61, and the revolution-preventing plate member 61 is fixed to the body 3 by the fixing bolt 63, as shown in FIG. 6. Thereby, the revolution-preventing plate member 61 becomes difficult to rotate to the body 3, and the lid member 2 becomes further difficult to loosen. Incidentally, instead of the bolt 63, a revolution-preventing member 61 provided with projection regions by preliminarily performing bending work like FIG. 3 may be used. In this case, the attaching hole 64 is not a screw but it may be a hole engageable with the projecting region.

In this embodiment, such a configuration is adopted that the body 3 and the lid member 2 are provided, and the upper stem 50 and the lower stem 51 are supported by the shaft-attaching seal mechanisms 20 attached to the shaft-attaching holes 22 and 26 formed in the body 3 and the lid member 2, but such a configuration can be adopted that the shaft-attaching seal mechanisms are arranged on upper and lower portions in the body having an integral structure (not shown). In this case, since the upper and lower stems are supported by the body having the integral structure and the ball is attached inside the body with high precision, integration can be wholly achieved by making the rotation-preventing plate member and the retaining member unnecessary while preventing displacement of the seat retainer to the ball or shaft wobbling of the ball member.

FIG. 1 shows a state where a manual handle 65 has been attached to the valve main body 1. The manual handle 65 is provided on an upper end portion of the upper stem 50 to be capable of being attachably and detachably attached thereto, and it is provided with a grasping portion 66 for rotational operation of the ball 10. Though not shown, a projecting portion is provided on a distal end side of the grasping portion 66.

As shown in FIG. 1 and FIG. 2, a plurality of stopper portions 67 are integrally formed on an upper face of the body 3 in a projecting manner, and the projecting portion of the handle 65 can abut on the stopper portions 67 during rotation operation. Thus, the projecting portion abuts on the stopper portion 67 so that the rotation of the handle 65 can be restricted to a predetermined operation angle. Thereby, if the stopper portions 67 are formed at intervals of 90°, a predetermined valve-closed state or valve-opened state can be achieved by operating the handle 65 in a rotational manner by 90°. Further, by providing a plurality of sets of stopper portions 67 for valve opening and valve closing, the handle 65 can be attached to the valve body 1 while an orientation of the handle 65 to the valve body 1 is changed.

Figure 8:
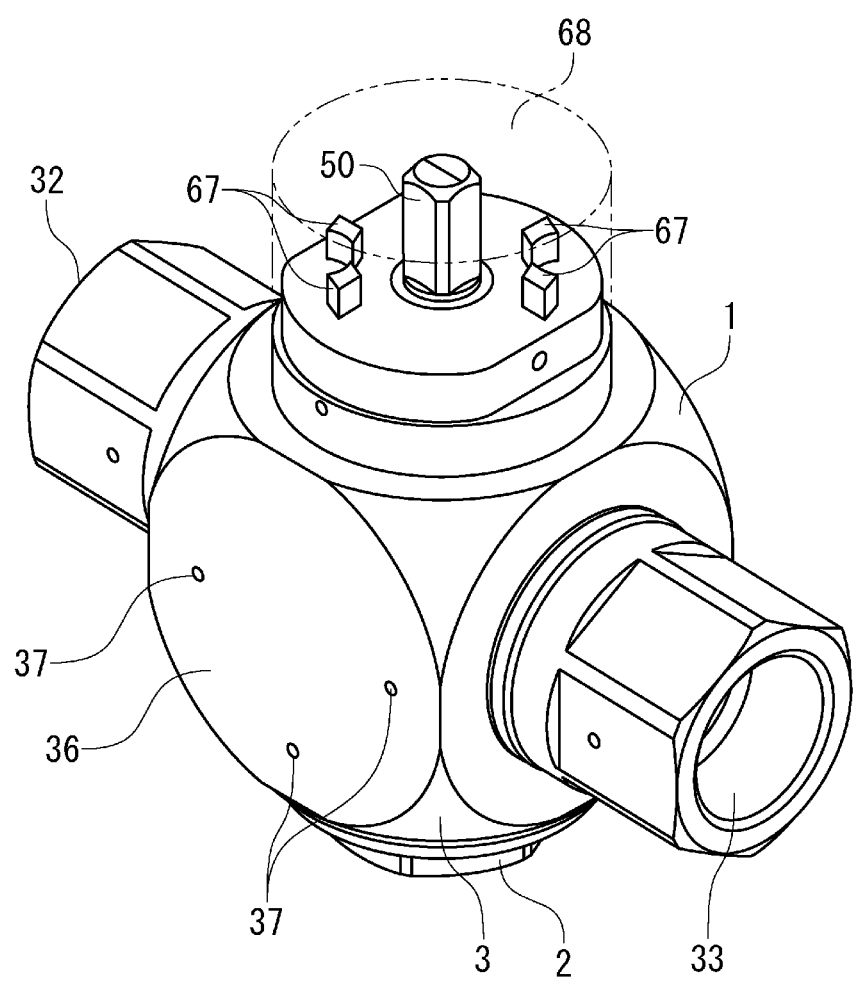
FIG. 8 is a perspective view showing a high-pressure trunnion ball valve from which a manual handle has been detached.

Valve opening and closing operations can be performed automatically by mounting an actuator (not shown) on the valve main body 1. In this case, as shown by a two-dot chain line in FIG. 8, a cylindrical member 68 with a proper height size is mounted on an upper face side of the body 3 mounted with the actuator, and an output shaft (not shown) of the actuator and the upper stem 50 can be connected to each other via the cylindrical member 68. Thus, by interposing the cylindrical member 68, the stopper portion 67 does not interfere with mounting of the actuator and the actuator can be mounted on the valve main body 1 at a predetermined interval. Further, by setting the height of the cylindrical member 68 properly, mounting of actuators corresponding to various standards can also be made possible.

Next, an operation of the above-described embodiment of the high-pressure trunnion ball valve in the present invention will be described.

Since the high-pressure trunnion ball valve of the present invention is a trunnion valve where the seat retainers 11 and 11 on the primary and secondary sides are elastically forced to the seal sides by the spring members 12, respectively, opening and closing operations can be performed in a state where the seat retainers 11 have been brought into close contact with the ball 10, and for example, even when a high-pressure fluid with a pressure of 103 MPa, such as hydrogen, is caused to flow, leak can be securely prevented by utilizing the high-pressure fluid to utilize a self-tensioning force pressing the seat retainers 11 to the ball 10 and securing sealing performance.

At this time, since the upper stem 50 and the lower stem 51 having the same diameter are provided on the upper portion and the lower portion of the ball 10 in an extending manner, respectively, to constitute the ball member 52 and the shaft-attaching seal mechanisms 20 having the same structure are attached at symmetrical positions regarding the ball 10, loads in the thrust directions (in axial center directions of the respective stems 50 and 51) applied to the upper stem 50 and the lower stem 51 when a fluid pressure is applied to the ball 10 can be made equal to each other to be cancelled. Thus, by providing the balance structure, occurrence of the thrust loads can be avoided.

Specifically, regarding the shaft-attaching seal mechanisms 20 attached to the upper stem 50 and the lower stem 51, respectively, especially the inner diameters of the U ring seals 55 are set to have the same size. Thereby, since the shaft seal diameters of the upper stem 50 and the lower stem 51 become the same, forces F toward the outside of the valve which the respective stems 50 and 51 receive by a fluid pressure become the same, to be cancelled.

Therefore, even if the stems 50 and 51 receive a fluid pressure, occurrence of the thrust loads is avoided, the ball 10 is not moved upward and downward, so that a valve seal performance between the seat retainer 11 and the seal face 42 can be maintained. Since the shaft-attaching seal mechanisms 20 are arranged at symmetrical positions regarding the ball 10, the bearings 58 attached to the respective shaft-attaching seal mechanisms 20 on the ball 10 side can be arranged at symmetrical positions regarding the ball 10. Since displacements of the ball 10 sides of the upper and lower stems 50 and 51 due to a fluid pressure in the radial directions become large, the upper and lower stems 50 and 51 where the above-described displacements have been suppressed by supporting these regions by the bearings 58 can be securely sealed by the shaft-attaching seal mechanisms 20.

In addition, the bearings 58 are also attached to the upper stem 50 and the lower stem 51, respectively, such that they take the same structure at symmetrical positions regarding the ball 10. Thereby, a force which the ball 10 receives from a fluid pressure can be received by the bearings 58 attached to the upper and lower stems 50 and 51 evenly.

In particular, in the valve-closed state, the ball 10 is forced to move toward the secondary side by the load in the radial direction (the diametrical direction of the stem) due to the above-described fluid pressure. Since the load is supported evenly regarding the upward direction and the downward direction by the respective bearings 58 and 58 via the upper and lower stems 50 and 51 integrally formed on the ball 10, particularly the valve operation in the vicinity of the valve-closed position can be performed smoothly when the valve is subjected to valve-opening operation or valve-closing operation.

Thereby, upward and downward movements of the ball 10 can be prevented, so that a possibility that the ball 10 displaces to the seat retainers 11 is excluded. Therefore, the seat retainers 11 contact with the ball 10 evenly at proper seal positions, and stable valve seat seal performance is secured to prevent leaking. During rotational operation of the ball 10, occurrence of a frictional resistant force due to the thrust load to the ball 10 is prevented, low torque performance is exerted by evenly supporting the ball member 52 by the upper and lower stems 50 and 51 via the seat retainers 11, and manual operation is also made easy since opening and closing operations can be performed with light force. At this time, torque fluctuation is also suppressed, so that operation can be performed with an approximately constant and stable operation torque.

Since the ball 10 sides of the bearings 58 are held by the flange portions 53 of the upper and lower stems 50 and 51 provided in the vicinity of the ball 10, the bearings 58 are prevented from flying out to the ball 10 side, so that the predetermined positions of the upper and lower stems 50 and 51 can be supported by the bearings 58. Therefore, the bearings 58 are prevented from interfering with the seat retainers 11 or the ball 10, so that high seal performance can be maintained.

Since the shaft-attaching seal mechanism 20 is composed of the respective members of the U ring seal 55, the backup ring 56, and the metal ring 57, replacements of these respective members can be performed easily even at a maintenance time while both the sliding performance and seal performance are maintained during rotation of the ball 10. Specifically, since the inner circumferential diameter of the metal ring 57 slightly projects toward the central side of the shaft-attaching hole 22, by using a proper jig from the outside of the shaft-attaching hole 22 to push out the metal ring 57, the metal ring 57, the U ring seal 55, and the backup ring 56 are moved to the vicinity of the attached position of the ball 10 to be detached from the side of the body 3 so that the respective members are not damaged.

At this time, since the shaft-attaching holes 22 and 26 of the body 3 side and the lid member 2 side are not formed to have a bind hole structure but they have a communication structure, it is easy to take out the respective members of the shaft-attaching seal mechanism 20. The respective members of the shaft-attaching seal mechanism 20 can be taken out by catching them by a proper jig from the outside of the shaft-attaching hole 22 to draw out them.

Since the shaft-attaching seal mechanisms 20 are arranged proximate the bearings 58, they are blocked from moving in the axial directions of the shaft-attaching seal mechanisms 20 by the bearings 58 positioned and held by the flange portions 53, so that displacements of the seal positions of the upper stem 50 and the lower stem 51 are prevented. The height of the valve main body 1 is also made low by these proximities.

Since the bottom entry structure where the ball member 52 is inserted into the body 3 from the bottom side of the body 3 and the body 3 is covered with the lid member 2 is adopted, it is unnecessary to provide a structure for drawing out the ball member 52 on the upper side of the valve main body 1, and it is also possible to provide the upper side of the valve main body 1 so as to provide an arbitrary structure for attachment of the manual handle 65 or the actuator with high degree of freedom. When the lid member 2 is detached from the body 3, the bottom side of the body 3 is opened largely, so that disassembling and assembling of the valve main body 1 are made easy. By providing an opening side on the bottom region in this manner, for example, in this embodiment, when the spherical diameter of the ball 10 is 20 mm and the outer diameter of the shaft seal region is 18 mm, assembling can be performed easily by making the opening large without reducing the opening side corresponding to the outer diameter of the shaft seal region, and a thickness required for a high-pressure valve can be secured and the strength can be improved by forming the body 3 thick.

At an assembling time of the valve main body 1, constituent parts of the shaft-attaching seal mechanism 20 on the upper side to be attached to the upper stem 50 are sequentially inserted into the shaft-attaching hole 22 of the body 3. In this stage, the O-ring 54 shown in FIG. 2 is attached to a groove-like region of the small diameter portion 22a in advance.

The ball 10 and the upper stem 50 formed integrally with the lower stem 51 are inserted into the shaft-attaching hole 22 inserted with the shaft attaching seal mechanisms 20 and are housed at predetermined positions within the body 3. At this time, the step portion 50a regarding the fitting region to which the handle 65 is fitted is present on the upper portion of the upper stem 50, but since the step portion 50a is formed in a tapered shape, the upper stem 50 can be inserted into the shaft-attaching seal mechanism 20 smoothly.

On one hand, the shaft-attaching seal mechanism 20 on the lower side attached to the lower stem 51 is inserted into the lid member 2 in advance like the case of the body 3. While plugging into the lower stem 51 formed integrally in the ball 10 housed in the body 3 is being performed, the male screw 25 and the female screw 24 are screwed to each other to achieve attaching into the attaching hole 23 of the body 3. At this time, since the relief hole 28 is opened in the lid member 2, the lower stem 51 can be inserted into the shaft-attaching seal mechanism 20 inserted into the lid member 2 while air is being prevented from being sealed in the lid member 2. Thereafter, the lid member 2 inserted with the lower stem 51 is screwed and fixed to the body 3. In this state, the ball 10 is not restricted regarding the axial core directions of the upper and lower stems 50 and 51, so that it can be moved upward and downward.

Next, the inflow portion 32 and the outflow portion 33 inserted with the valve seat seal parts composed of the seat retainer 11, the spring member 12, the spring retainer 14, the seal member 13, and the auxiliary ring 15 are attached to and integrated with the body 3 and the lid member 2 integrated while these shaft-attaching seal mechanisms 20 are being attached to the inside, respectively, by screwing the male screws 32a and 33a and the female screws 3a and 3a. After assembling according to such a procedure, the inflow side and the outflow side of the ball 10 are held by the seat retainers 11 elastically forced by the spring members 12, respectively, so that the valve main body 1 is provided in a state where the centers of the ball 10 and the respective seat retainers 11 have been aligned accurately.

By attaching the handle 65 to the upper end portion of the upper stem 50 of the valve main body 1, the ball 10 can be opened and closed according to manual operations, and valve opening and closing operations can be automatically performed by mounting the actuator.

At a repairing or maintenance time of the valve main body 1, a procedure reversed to the assembling method is fundamentally performed. At this time, particularly, since respective parts of the shaft-attaching seal mechanism 20 attached to the upper stem 50 can be pushed out below the body 3 (on the ball 10 side) from the outside of the shaft-attaching hole 22 by a cylindrical jig in FIG. 2, detachment is made easy.

Since the valve main body 1 is the high-pressure valve, it becomes necessary to elongate the male screw portion 25 of the lid member 2 and the female screw portion 24 of the body 3 to enhance screwing strength, but since the female screw portion 24 is provided in parallel with the shaft-attaching seal mechanism 20, a minimum length can be set while the lid member 2 is prevented from being made large in the axial direction unnecessarily, and the height of the valve main body 1 becomes low in cooperation with the above-described proximity structure between the shaft-attaching seal mechanism 20 and the bearing 58. In addition, since the outer circumferential face intersecting the flow path direction of the body 3 is formed in a flat face 36, the width in the flow path direction of the body 3 can be shortened, so that the whole body 3 is made compact, which also allows installation of the valve main body 1 in a narrow place.

Since the relief hole 28 communicating with the lower portion of the lower stem 51 is bored in the lid member 2, when a pressure difference between the shaft-attaching portion on the upper stem 50 side and the shaft-attaching portion on the lower stem 51 side occurs, leak can be detected through the relief hole 28. Further, leak also occurs from the leak port portion 37a bored in the flat face 36 of the body 3, so that such a problem that an internal pressure in the valve main body 1 becomes high is solved, and it is avoided that valve seat seal performance and operability are damaged. Since the leak port portion 37a is bored in the flat face 36, formation is made possible while the leak port portion 37a is positioned at a predetermined position on the body 3 accurately.

Since the revolution-preventing plate member 61 is attached to the abutting face between the body 3 and the lid member 2 via the retaining member 63, the body 3 and the lid member 2 can be firmly integrated with each other, and the upper stem 50 and the lower stem 51 are supported at a predetermined position by the body 3 and the lid member 2 to position the ball 10 and the seat retainers 11 and maintain the seal state, thereby being capable of avoiding thrust loads.

Figure 9:
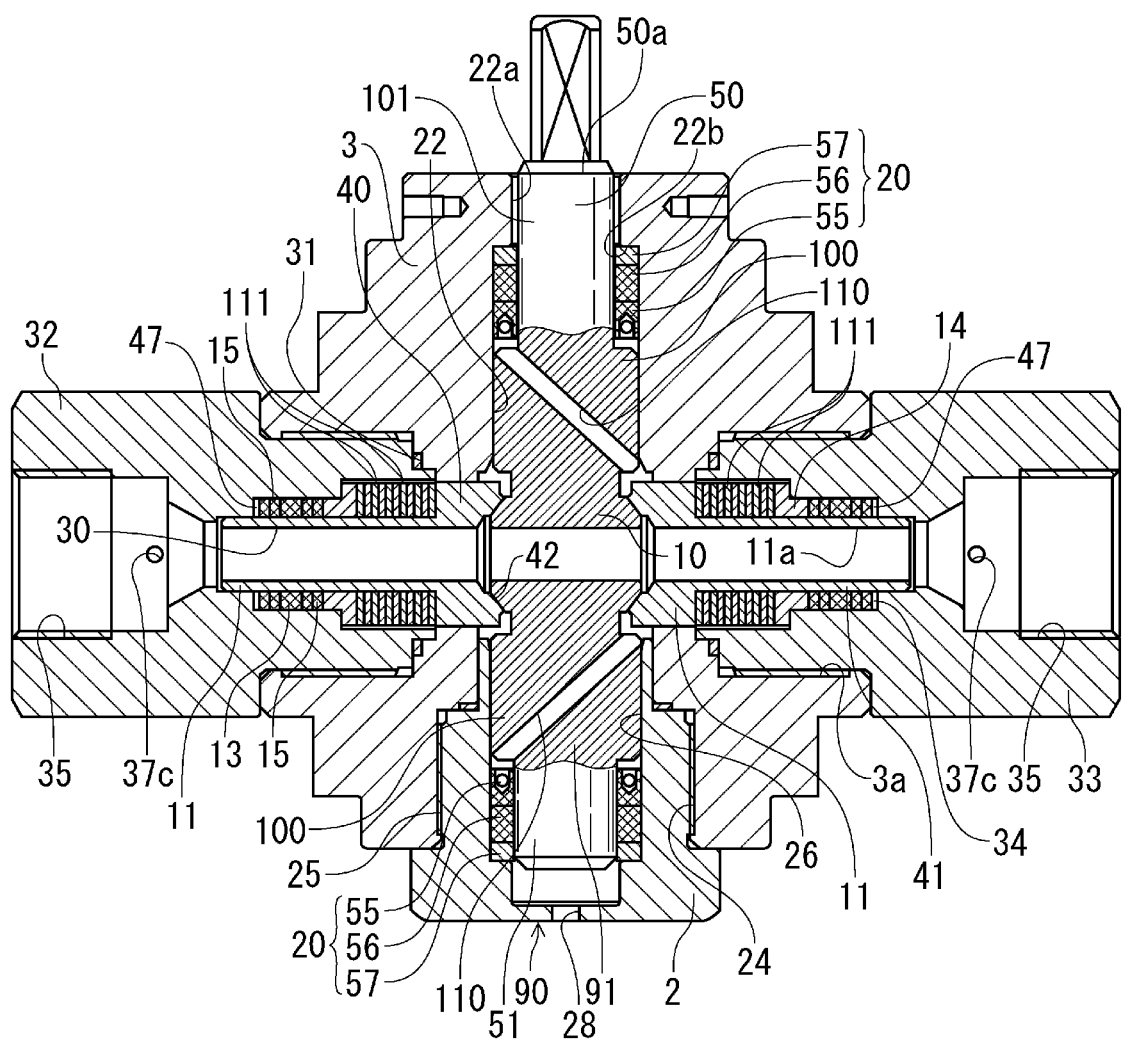
FIG. 9 is a vertical sectional view showing another embodiment of the high-pressure trunnion ball valve of the present invention.

FIG. 9 shows another embodiment of the high-pressure trunnion ball valve of the present invention. Incidentally, in this embodiment and embodiments subsequent thereto, same portions as those in the previous embodiment are attached with same reference signs, and explanations thereof will be omitted.

In the embodiment shown in FIG. 2, the radial bearing 59 formed by coating resin such as PTFC on a core metal is used in the inner circumferential side of the bearing 58. The resin is a material suitable for maintaining slidability, but it may be worn according to such a usage condition that the frequency of opening and closing operations of the valve is high. When the resin coating is worn, since clearances between the bearings 58 and the upper and lower stems 50 and 51 are expanded, the ball 10 receiving a super high-pressure fluid is pushed to the downstream side and a moving amount is slightly increased, so that the upper and lower stems 50 and 51 are tilted in a <-shape about the ball 10, which results in possibility that seal performance obtained by the shaft-attaching seal mechanisms 20 lowers. Further, due to expansions of the clearances between the bearings 58 and the upper and lower stems 50 and 51, surface contacts between the upper and lower stems 50 and 51 and the radial bearings 59 are damaged, which results in possibility that the thrust loads of the upper and lower stems 50 and 51 increase.

In order to avoid this, in a valve main body 90 in this embodiment, diameter-expanded sliding portions 100 having diameters larger than the diameters of the upper and lower stems 50 and 51 are provided integrally. The diameter-expanded sliding portions 100 are formed to have outer diameters coming in close contact with the shaft-attaching holes 22 and 26 provided in the body 3 to have the same diameter, and when the ball member 91 is attached to the body 3, the diameter-expanded sliding portions 100 are provided slidably in the close contact state with the shaft-attaching holes 22 and 26.

Thereby, the clearances between the upper and lower stems 50 and 51 and the shaft-attaching holes 22 and 26 are reduced only between the diameter-expanding sliding portions 100 and the shaft-attaching holes 22 and 26, and since the diameter-expanding sliding portions 100 are provided near the ball 10, a strength near the center of the ball member 91 is improved. Therefore, even when the so-called super high-pressure fluid with a pressure of 103 MPa or more flows to the ball 10, the upper and lower stems 50 and 51 are hard to bend in a <-shape regarding the ball 10. Thereby, rising of the radial loads from the ball member 91 toward the shaft-attaching holes 22 and 26 is blocked, so that rising of the torque during operation is avoided and seal performance between the upper and lower stems 50 and 51 and the shaft-attaching seal mechanisms 20 can be secured. Since the upper and lower stems 50 and 51 having the same diameter are provided, on upper and lower sides about the ball 10, at positions where the shaft-attaching seal mechanisms 20 and 20 having the same structure are opposed to each other, rising of the thrust loads is also avoided while the balance structure is maintained.

Coating layers 101 made of diamond-like carbon (DLC) are provided on surfaces of the ball member 91 provided with the diameter-expanding sliding portions 100 like the case of the seat retainers 11. The ball member 91 is formed of BeCu alloy, for example, and coating process made of DLC is performed on surfaces of the upper and lower stems 50 and 51 including the diameter-expanding sliding portions 100 of the ball member 91 and regions including the ball 10.

When the coating layer 101 made of DLC is provided on the ball member 91 in this manner, surface smoothness, lubricity, wear-resistance property and the like of the ball member 91 are improved. Therefore, adhesion to the shaft-attaching holes 22 and 26 is enhanced while excellent bearing function is exerted on the upper and lower stems 50 and 51 provided with the diameter-expanding sliding portions 100, the slidability is secured in such a state that occurrence of a clearance has been suppressed, and smooth operation of the ball member 91 is made possible. On the ball 10 side, seal performance with the seat retainers 11 is enhanced so that leak is securely prevented.

Here, for example, when the diameter-expanding sliding portion 100 and the shaft-attaching hole 22 are brought into close contact with each other over a whole circumference to such an extent that fluid is sealed by the upper stem 50, a seal diameter to the lower stem 51 sealed by the shaft-attaching seal mechanism 20 becomes large, so that since magnitude of the load in the thrust direction is biased to the upper stem 50 side, the balance structure is lost. Thereby, there is a possibility that the ball 10 moves to the upper stem 50 side, and the valve seat seal performance is lost.

Figure 10:
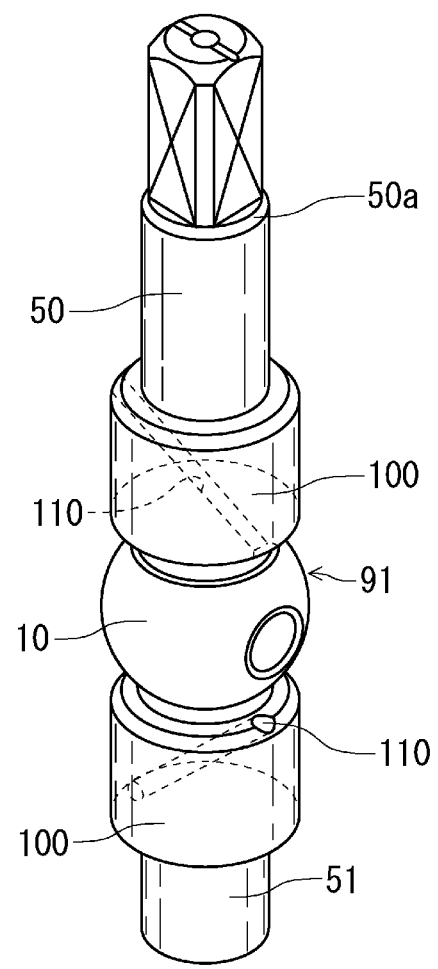
FIG. 10 is a perspective view showing a ball member shown in FIG. 9.

Therefore, as shown in FIG. 10, communication portions 110 causing the ball 10 side and the shaft-attaching seal mechanisms 20 to communicate with each other are provided on the respective diameter-expanding sliding portions 100 of the upper and lower stems 50 and 51. The communication portions 110 are composed of communication holes extending through in directions intersecting the center shafts of the diameter-expanding sliding portions 100, and in FIG. 9, when the ball member 91 is attached to the body 3, the communication portions 110 are formed in an inclined state at opposed positions of the outer circumferences of the diameter-expanding sliding portions 100. As long as communication between the ball 10 side and the shaft-attaching seal mechanism 20 side is possible, the communication portion 110 can be properly modified regarding its inclined direction and hole diameter, and it may be provided in a curved or notched state, or it may be provided in the axial direction. When the communication potions are provided as the communication holes 110 in an inclined manner like this embodiment, communication is made possible without lowering the strengths of the upper and lower stems 50 and 51 while the hole diameters are largely secured on the upper and lower faces of the diameter-expanding sliding portions 100, and restriction is reduced regarding the space for forming the communication holes 110.

Since the communication portions 110 for pressure relief are provided in the diameter-expanding sliding portions 100 in this manner, a fluid pressure is released from the ball 10 side to the shaft-attaching seal mechanisms 20 side so that even pressure state occurs in the cavity, and the shaft seal performances of the shaft-attaching seal mechanisms 20 are maintained. Therefore, the thrust loads to the upper and lower stems 50 and 51 due to the fluid pressure are not changed, and these upper and lower stems 50 and 51 sides are kept in even pressure, so that the balance state of the ball member 91 regarding the upward direction and the downward direction is secured. From this, even when the clearances between the diameter-expanding sliding portions 100 and the shaft-attaching holes 22 and 26 are made small to the utmost limit, displacement in the axial direction is prevented even when a fluid pressure is forced to act on the diameter-expanding sliding portion 100 from the ball 10 side, so that the balance structure attached with the shaft-attaching seal mechanisms 20 is maintained and bias of the thrust load can be avoided securely.

Incidentally, in this embodiment, a plurality of disc springs 111 is attached to the seat retainer 11 as a spring member. When the disc springs 111 are used in this manner, an elastic force in the ball 10 direction is enhanced, so that the seal performance is improved. Further, the diameters of the diameter-expanding sliding portions 100 may be different between the upper and the lower stems 50 and 51.

Figure 11:
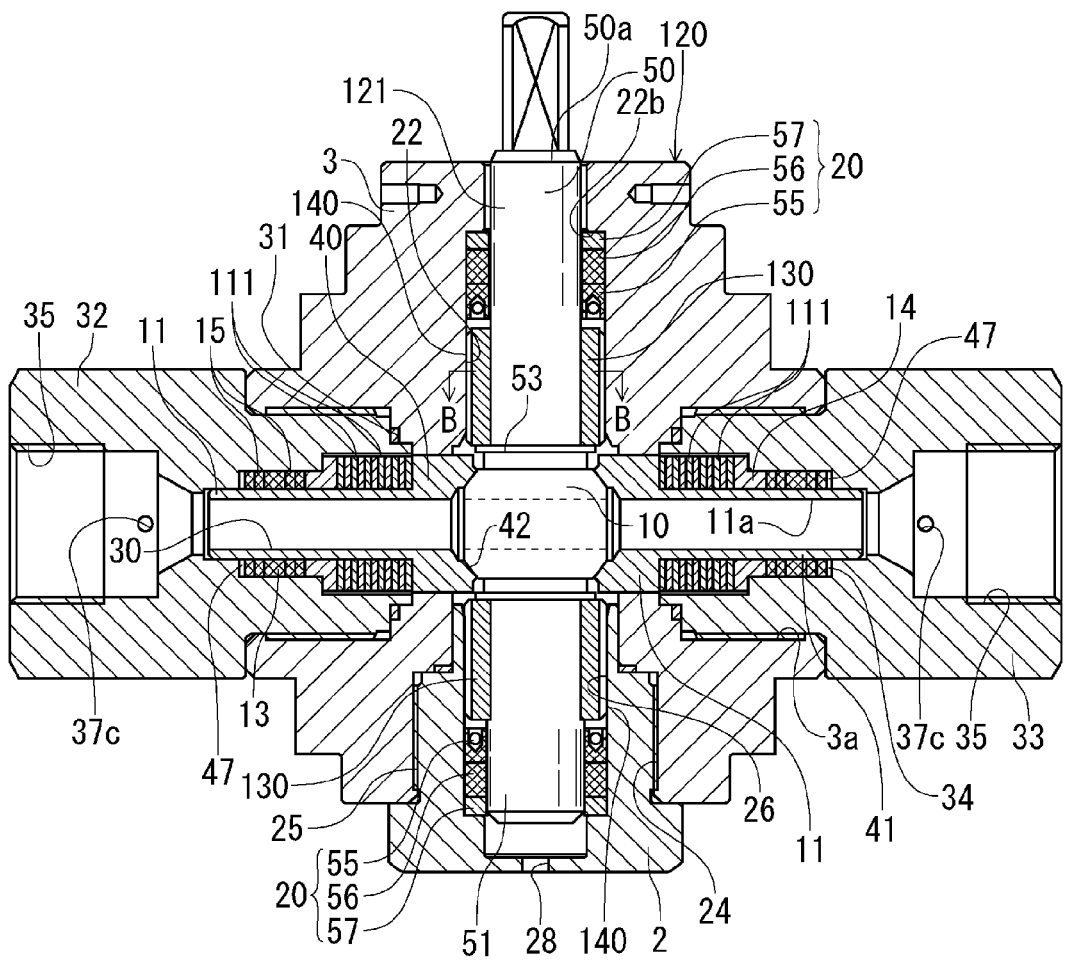
FIG. 11 is a sectional view showing still another embodiment of the high-pressure trunnion ball valve of the present invention.
Figure 11:
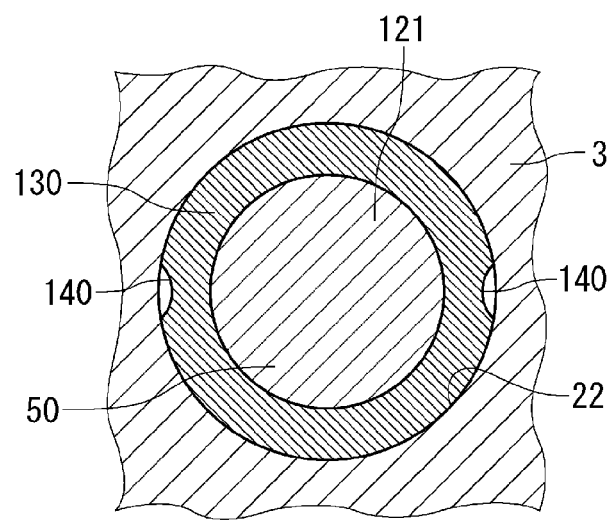

FIG. 11 shows still another embodiment of the high-pressure trunnion ball valve of the present invention, FIG. 11(a) being a vertically sectional view of the high-pressure trunnion ball valve and FIG. 11(b) being a sectional view taken along line B-B in FIG. 11(a).

In a valve main body 120 of this embodiment, as shown in FIG. 11(a), sliding cylindrical bodies 130 having diameters expanded to be larger than those of the upper and lower stems 50 and 51 of a ball member 121 and provided to have outer diameters coming in close contact with the shaft-attaching holes 22 and 26 are formed as separate members, and the sliding cylindrical bodies 130 are attached to the upper and lower stems 50 and 51, respectively. Regarding the diameters of the upper and lower stems 50 and 51, the same diameter is adopted even at positions opposed to the sliding cylindrical bodies 130 and positions opposed to the shaft-attaching seal mechanisms 20.

Ball 10 sides of the sliding cylindrical bodies 130 are held by the flange portions 53 of the upper and lower stems 50 and 51. Thereby, the sliding cylindrical bodies 130 are restricted from moving to the ball 10 side. The flange portion 53 in this embodiment is formed to have an outer diameter capable of holding the sliding cylindrical body 130. The sliding cylindrical body 130 on the lower stem 51 side may abut on an upper face of the U ring seal 55 by self-weight.

The sliding cylindrical bodies 130 are formed of aluminum bronze to have an aspect of one layer, for example, and they are slidably provided in the shaft-attaching holes 22 and 26 at an attaching time of the ball member 121 to the body 3. Thereby, respective clearances between the upper and lower stems 50 and 51 and the shaft-attaching holes 22 and 26 are reduced as compared with the above-described valve main body 1, and even if a super high-pressure fluid with a pressure of 103 MPa or more flows, movement of the ball 10 and tilting of the upper and lower stems 50 and 51 are prevented so that low torque performance and the shaft seal performance during operation are secured.

In this case, the ball member 121 is formed of stainless material, for example, and the sliding cylindrical bodies 130 are attached to the upper and lower stems 50 and 51 of the ball member 121.

Further, though not shown, coating layers made of DLC may be provided on at least inner circumferences of the sliding cylindrical bodies 130 provided as the separate members like the case where the sliding cylindrical bodies 130 have been provided integrally with the upper and lower stems 50 and 51.

Figure 12:
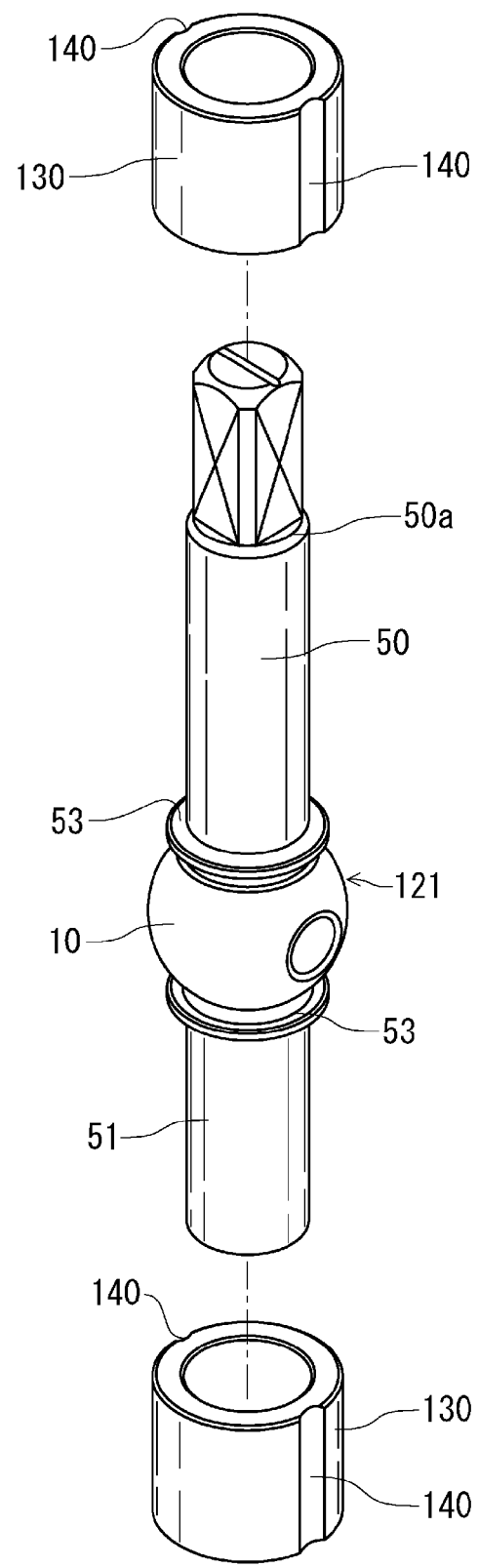
FIG. 12 is a separated perspective view of the ball valve in FIG. 11.

As shown in FIG. 12, a communication portion 140 composed of a communication groove performing communication between the ball 10 side and the shaft-attaching seal mechanism 20 is provided on each sliding cylindrical body 130. Two communication grooves 140 are formed on an outer circumference of the sliding cylindrical body 130 along an axial direction. In FIG. 11(b), fluid flow paths are provided between the sliding cylindrical bodies 130 and the shaft-attaching holes 22 and 26 to prevent a difference pressure between the upper and lower portions of the sliding cylindrical bodies 130, so that occurrence of the so-called piston phenomenon that the sliding cylindrical bodies 130 receive a fluid pressure via the communication grooves 140 to be forced to move outside the valve is prevented. Therefore, damages of the U ring seals 55 of the shaft-attaching seal mechanisms 20 arranged on the upper and lower sides of the respective sliding cylindrical bodies 130 are avoided, so that shaft-attaching seal forces obtained by the shaft-attaching seal mechanisms 20 are maintained. In this case, even when a non-compressive fluid, such as an ionic liquid, tending to generate the piston phenomenon flows, the piston phenomenon is securely avoided by the communication grooves 140. Incidentally, in addition to the above-described communication grooves 140, fluid introduction grooves may be provided on the shaft-attaching holes 22 and 26 opposed to the outer circumferences of the respective sliding cylindrical bodies 130 like the above-described ball valve main body 1.

In addition, since two communication grooves 140 are provided at positions opposed to the outer circumference of the sliding cylindrical body 130, even if a fluid flow path of either one of the communication grooves 140 is narrowed or closed by refuse or the like, a fluid flows through the other communication groove 140, so that an even pressure state in the cavity is maintained securely. With the above-described configuration, the seal performances obtained by the shaft-attaching seal mechanisms 20 are maintained in the upper and lower stems 50 and 51, and the above-described balance structure is maintained.

Figure 13:
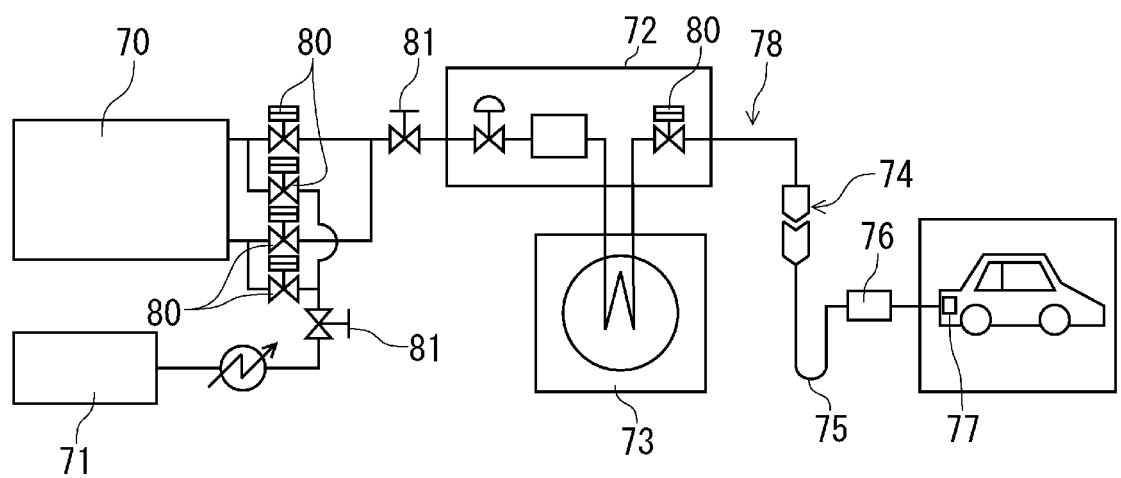
FIG. 13 is a block diagram showing a hydrogen station.

FIG. 13 shows a hydrogen station provided with the high-pressure trunnion ball valve of the present invention. The above-described valve main body 1 is connected to the hydrogen station, and the valve main body 1 is used in a supply line for a high-pressure hydrogen of the hydrogen station.

The hydrogen station has a pressure accumulator 70, a compressor 71, a dispenser 72, a pre-cool heat exchanger 73, a quick coupling unit 74, a filling hose 75, a filling nozzle 76, and a vehicle-mounting tank 77, and these members constitute a system as a supply line 78 for a high-pressure hydrogen.

Since the high-pressure trunnion ball valve of the present invention has low pressure loss, pressure loss of the whole system is reduced by providing the high-pressure trunnion ball valve on the secondary side of the pressure accumulator 70 or providing the same to the other supply line, and it is suitable for a system shown in FIG. 13. As shown in the figure, opening and closing are controlled by providing manual valves 81 at connection regions of respective units of the hydrogen station, and properly providing automatic valves 80 on the primary sides or the secondary sides of the respective units.

The interior of the pressure accumulator 70 is divided to a plurality of tanks, and by performing switching of valves 80 connecting the respective tanks and the compressor 71 and valves 80 connecting the respective tanks and the dispenser 72 properly, hydrogen is supplied from a tank whose pressure has reached a predetermined pressure to the dispenser while hydrogen is filled in a tank whose pressure has lowered below a predetermined lower limit pressure up to the above-described predetermined pressure from the compressor 71.

As shown in the supply line 78 of a block diagram of the hydrogen station in FIG. 13, according to a predetermined program, hydrogen supply in the system is controlled or it can be made possible to supply hydrogen in response to a vehicle supply amount.

Incidentally, the above-described hydrogen station is provided with the valve main body 1, but the valve main bodies 90 and 120 can be used in the hydrogen station similarly.

INDUSTRIAL APPLICABILITY

The present invention is particularly suitable for a piping installation such as a hydrogen station where hydrogen or the like which is a high-pressure fluid used in a fuel cell flows, but excellent seal performance and torque performance can be exerted in a conduit line in which a high-pressure fluid flows, and for example, the present invention is suitable as a valve in a CNG (Compressed Natural Gas)

station or as a high-pressure ball valve used in a place where various high-pressure fluids flow, such as a pipeline valve or the like.

The invention claimed is:

1. A high-pressure trunnion ball valve comprising:
   a ball rotatably provided within a body having a lid member;
   a seat retainer seal-connected with the ball;
   a spring member applying an elastic force toward a seal side to the seat retainer; and
   a seal member attached to an outer circumferential face of the seat retainer, wherein
   an upper stem and a lower stem having a same diameter and a same cylindrical-shape are provided on an upper portion and a lower portion of the ball in an extending manner, respectively, to constitute a ball member, shaft-attaching seal mechanisms having a same structure are attached to the upper and lower stems at symmetrical positions about the ball to constitute a balance structure, thereby avoiding thrust loads, and flange portions are provided at positions on the upper and lower stems in the vicinity of the ball, thereby non-sealingly holding ball sides of bearings provided on outer circumferences of the upper and lower stems by the flange portions.

2. The high-pressure trunnion ball valve according to claim 1, wherein
   the shaft-attaching seal mechanisms are each obtained by providing a U ring seal on the ball sides, stacking a backup ring on the U ring seal, and providing a metal ring whose inner circumferential diameter has been projected by a predetermined amount to an outer circumferential position.

3. The high-pressure trunnion ball valve according to claim 1, wherein
   the ball member is inserted from a bottom side of the body to be disposed within the body, covering with the lid member is performed from the bottom side of the body, and the lower stem is attached to the lid member.

4. The high-pressure trunnion ball valve according to claim 1, wherein
   a relief hole communicating with the lower portion of the lower stem is bored in the lid member.

5. The high-pressure trunnion ball valve according to claim 1, wherein
   a revolution-preventing plate member is attached to an abutting face between the body and the lid member.

6. The high-pressure trunnion ball valve according to claim 1, wherein
   an inflow portion and an outflow portion are fixed to both side positions on the body in a flow path direction of the body, an outer circumferential face of the body intersecting the flow path direction is formed in a flat face, and a leak port communicating with an interior of the body is bored in the flat face.

7. The high-pressure trunnion ball valve according to claim 6, wherein
   diameter-expanding sliding portions are provided integrally with the upper and lower stems, respectively, and the diameter-expanding sliding portions are slidably provided in shaft-attaching holes of the body.

8. The high-pressure trunnion ball valve according to claim 7, wherein
   coating layers made of diamond-like carbon are provided on surfaces of the ball member and the diameter-expanding sliding portions.

9. The high-pressure trunnion ball valve according to claim 7, wherein
   sliding cylindrical bodies as separate members are attached on the upper and lower stems, and the sliding cylindrical bodies are slidably provided in the shaft attaching holes of the body.

10. The high-pressure trunnion ball valve according to claim 9, wherein
    communication portions causing the ball sides and the shaft-attaching seal mechanisms to communicate with each other are provided in the diameter-expanding sliding portions or the sliding cylindrical bodies.

11. The high-pressure trunnion ball valve according to claim 10, wherein
    the communication portions are communication holes extending through outer circumferential faces of the diameter-expanding sliding portions or communication grooves formed on outer circumferences of the sliding cylindrical bodies in the axial direction.

12. A hydrogen station constituted by using the high-pressure trunnion ball valve according to claim 1 in a supply line for high-pressure hydrogen.

* * * * *